United States Patent
Takeshita et al.

(10) Patent No.: US 8,267,429 B2
(45) Date of Patent: Sep. 18, 2012

(54) LOWER STRUCTURE OF AUTOMOTIVE VEHICLE

(75) Inventors: Hiroaki Takeshita, Hiroshima (JP); Takahiro Otani, Hiroshima (JP); Masanobu Fukushima, Hiroshima (JP); Ryuichi Kusama, Hiroshima (JP); Hiromasa Honji, Hiroshima (JP)

(73) Assignee: Mazda Motor Company (JP)

( * ) Notice: Subject to any disclaimer, the term of this patent is extended or adjusted under 35 U.S.C. 154(b) by 92 days.

(21) Appl. No.: 12/978,012

(22) Filed: Dec. 23, 2010

(65) Prior Publication Data

US 2011/0198832 A1    Aug. 18, 2011

(30) Foreign Application Priority Data

Feb. 15, 2010 (JP) .................................. 2010-030322

(51) Int. Cl.
    *B62D 21/00* (2006.01)
(52) U.S. Cl. ....................................................... 280/784
(58) Field of Classification Search .................. 280/781, 280/784; 180/311, 312; 296/187.03, 187.08, 296/187.09
    See application file for complete search history.

(56) References Cited

U.S. PATENT DOCUMENTS

| | | | | |
|---|---|---|---|---|
| 5,364,128 A | * | 11/1994 | Ide | 280/784 |
| 6,149,197 A | * | 11/2000 | Ishii et al. | 280/788 |
| 6,213,245 B1 | * | 4/2001 | Murata et al. | 180/377 |
| 6,692,052 B1 | * | 2/2004 | Sutton et al. | 296/35.2 |
| 7,201,398 B1 | * | 4/2007 | Christofaro et al. | 280/781 |
| 7,784,858 B2 | * | 8/2010 | Abe et al. | 296/203.04 |
| 2005/0077754 A1 | | 4/2005 | Tomita | |

FOREIGN PATENT DOCUMENTS

| | | | |
|---|---|---|---|
| JP | 06-298121 | | 10/1994 |
| JP | 2000229581 A | * | 8/2000 |
| JP | 2004-130827 A | | 4/2004 |
| JP | 2006-240325 A | | 9/2006 |
| JP | 2008-056191 A | | 3/2008 |

* cited by examiner

*Primary Examiner* — Paul N Dickson
*Assistant Examiner* — Robert A Coker
(74) *Attorney, Agent, or Firm* — Studebaker & Brackett PC; Donald R. Studebaker

(57) ABSTRACT

A positioning pin and a bolt hole positioned near this pin are provided at a plate-shaped rear-portion attachment face portion of a suspension cross member. A positioning hole having the positioning pin inserted thereinto and a bolt hole positioned near this positioning hole are provided at a tunnel frame on the side of a vehicle. The rear-portion attachment face portion and the tunnel frame are fastened by a bolt inserting into the bolt holes together with a nut. Accordingly, the support rigidity of the suspension cross member during the normal vehicle traveling can be secured and the smooth retreat of the power unit to restrain the collision load from having bad influence on passengers in the vehicle frontal collision can be achieved.

15 Claims, 20 Drawing Sheets

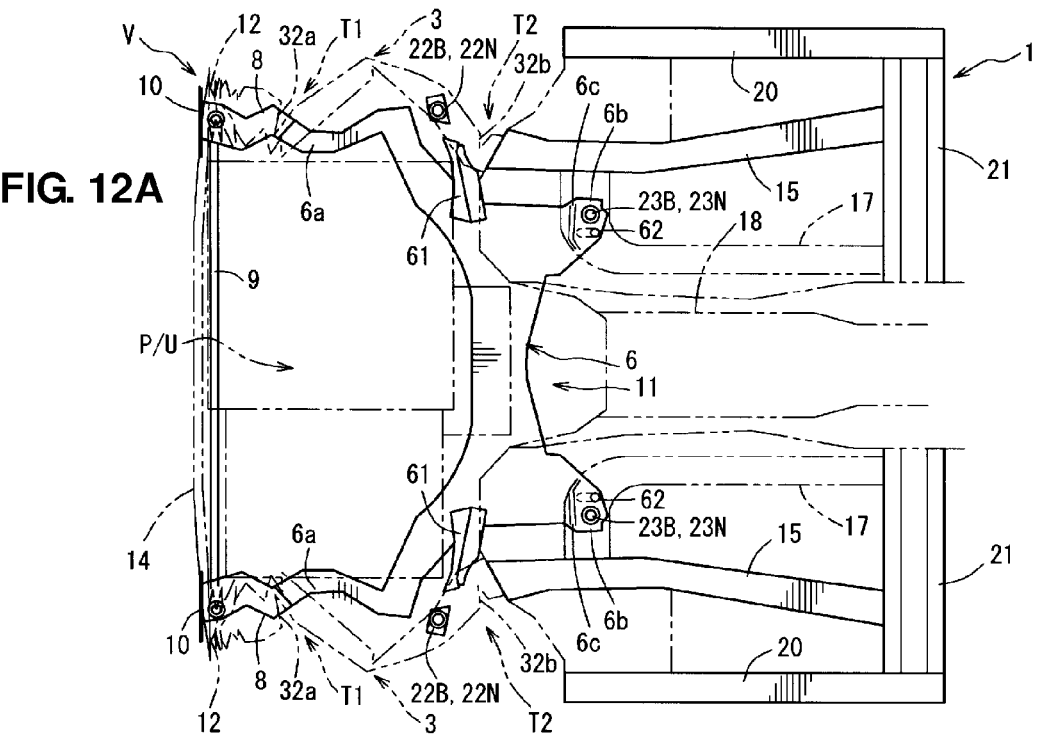
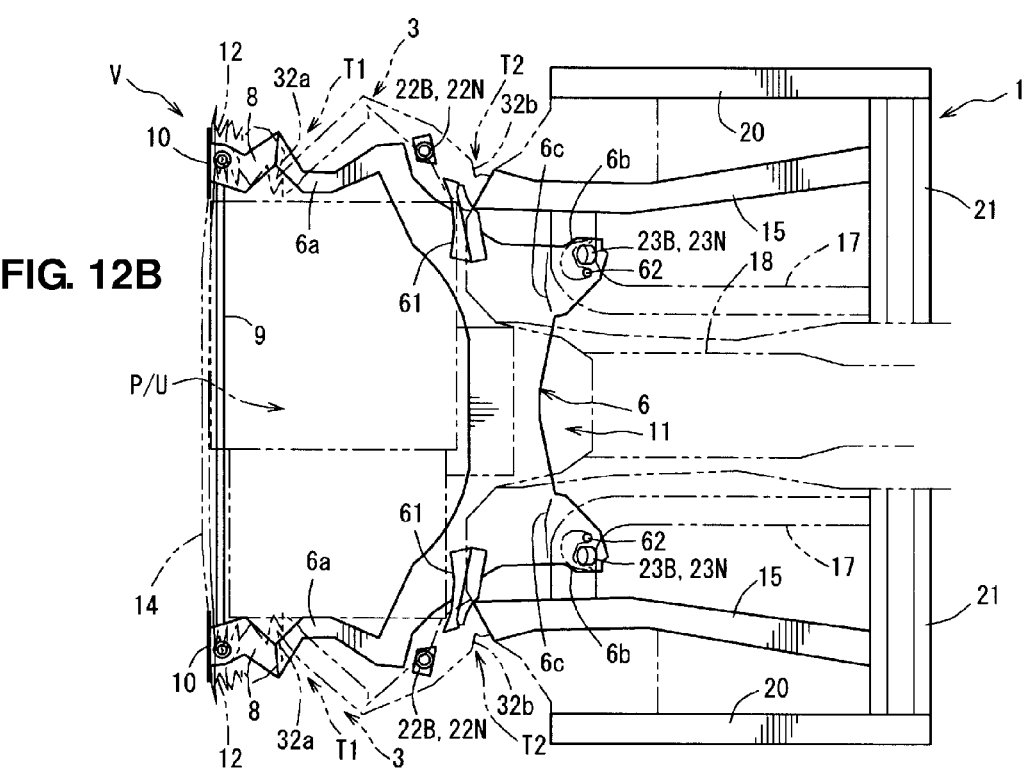

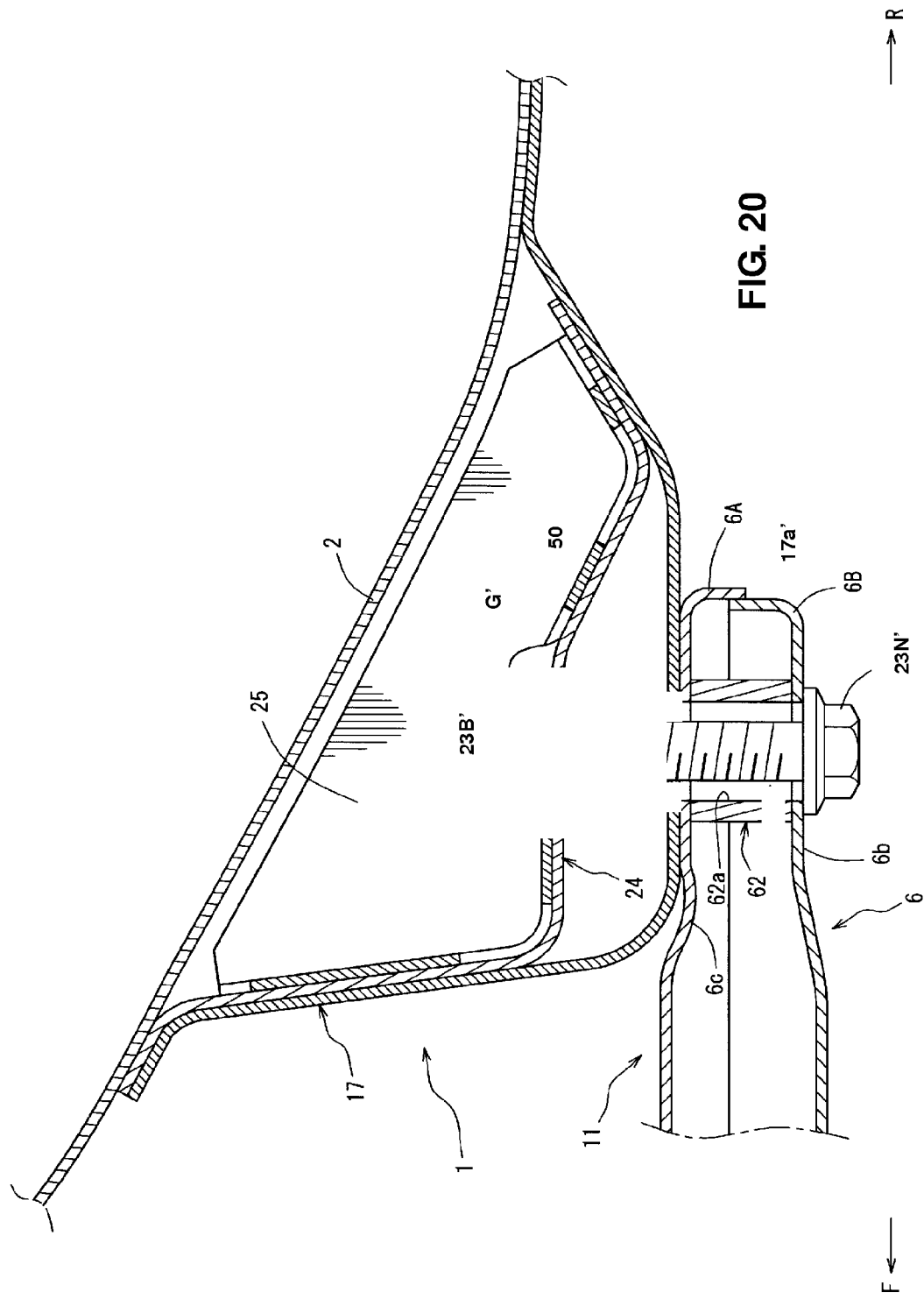

LOWER STRUCTURE OF AUTOMOTIVE VEHICLE

BACKGROUND OF THE INVENTION

The present invention relates to a lower structure of an automotive vehicle which comprises a suspension cross member provided behind a power unit and extending in a vehicle width direction and a plate-shaped vehicle-body-side support portion supporting the suspension cross member.

Many structures which can absorb the vehicle-collision energy at a vehicle front portion in order to restrain the collision load from having bad influence on passengers in the vehicle room in a vehicle frontal collision or the like have been proposed.

For example, Japanese Patent Laid-Open Publication No. 2004-130827 discloses a structure in which a through hole is provided, in the vicinity of a bolt hole, at a lower wall portion of a suspension cross member attachment portion of a front side member (front frame). In this structure, when a load of specified value or more acts on a bolt in the vehicle frontal collision, this bolt moves, expanding the bolt hole, and reaches the through hole. Thereby, the suspension cross member can be allowed to move rearwardly greatly relative to the front side member. In this case, since a smooth retreat of a power unit is not hindered by the suspension cross member, the absorption of the collision energy can be achieved securely by the retreat of the power unit.

US Patent Application Publication No. 2005/0077754 discloses a structure in which a pipe-nut upper end portion as a connecting member to connect a vehicle-body-side front frame to a chassis frame (suspension cross member) is supported at a vehicle-body-side plate member, and when a load of specified value or more acts in the vehicle frontal collision, the plate member gets broken, so that its connection to the pipe nut is released. Thus, the chassis frame can be detached from the vehicle body in this structure, so that it can be prevented that the retreat of the power unit is hindered by the chassis frame.

Japanese Patent Laid-Open Publication No. 6-298121 discloses a structure in which in a vehicle equipped with front wheels arranged in front of an engine as a power unit, there is provided a bead to cause deformation of a suspension cross member by the collision energy in the vehicle collision. In this structure, the front wheels move back according to a rearward slant of a suspension arm by the deformation of the suspension cross member in the vehicle frontal collision. Accordingly, a plastically-deformable portion of a side frame increases, so that an increase of the collision-energy absorption can be achieved.

Japanese Patent Laid-Open Publication No. 2006-240325 discloses a structure in which a collar, a rear portion of which is not connected to the vehicle-body-side suspension cross member, is provided at a connection portion of the suspension cross member to the vehicle-body-side side member in order to prevent that the retreat of the power unit is hindered by the power unit in the vehicle frontal collision. In this structure, as the suspension cross member moves rearwardly in the vehicle collision, the connection portion rotates rearwardly easily. Thereby, the connection portion, that is, the suspension cross member can be detached off the vehicle body easily.

Japanese Patent Laid-Open Publication No. 2008-56191 discloses a structure in which a bending promotion portion is formed at a middle portion of a side frame constituting a sub frame, and the middle portion of the side frame and the sub frame are connected by a middle support member and a connecting member. In this structure, as the power unit retreats relatively in the vehicle frontal collision, the side frame bends due to the function of the bending promotion portion, and the connection between the middle support member and the connecting member is released. Consequently, the suspension cross member can be detached from the side frame.

However, according to the structure disclosed in the above-described first patent document, since the through hole is formed near a connection portion, the rigidity of part of the vehicle near the connection portion decreases during the normal vehicle traveling. Thus, there is a concern that the support rigidity of the suspension cross member would be improperly low. Further, since the bolt is fixed firmly to the vehicle body in the normal state, the bolt may not be moved right away when the vehicle collision occurs. Accordingly, there is a problem in that the suspension cross member could not be moved smoothly.

According to the structure disclosed in the above-described second patent document, further, the plate member may not be broken right away after the occurrence of the vehicle collision for the reason described above in the structure disclosed in the first patent document. Thus, there is also a problem in that the suspension cross member could not be detached smoothly.

According to the structure disclosed in the above-described third patent document, meanwhile, there is no concept that it can be prevented by releasing the connection between the suspension cross member and the vehicle body that the smooth retreat of the power unit is hindered. Further, this structure may not sufficiently increase the collision-energy absorption which is conducted at the vehicle front portion. Accordingly, it would be impossible to properly restrain the collision load from having bad influence on passengers.

According to the structure disclosed in the above-described fourth patent document, there is formed a gap between a sub side member and the suspension cross member so that the connection portion between the vehicle body (sub side member) and the suspension cross member can rotate rearwardly easily. However, this gap may cause a decrease of the rigidity of the part of the vehicle near the connection portion during the normal vehicle traveling, so that there is a concern that the support rigidity of the suspension cross member would be improperly low.

According to the structure disclosed in the above-described fifth patent document, an opening is formed in front of a through hole into which a bolt fastening the side frame and the suspension cross member is inserted (see FIG. 3 in this patent document). In this case, the rigidity of a vehicle part near this bolt connection portion may be improperly low, so that there is a concern that the support rigidity of the suspension cross member would be decreased. Further, since the connection between the middle support member and the connection member is released by the moving bolt itself, this releasing may not be conducted right away after the occurrence of the vehicle collision for the reason described above in the structures disclosed in the first and second patent documents. Thus, there is also a problem in that the suspension cross member could not be detached smoothly.

SUMMARY OF THE INVENTION

An object of the present invention is to provide a lower structure of an automotive vehicle which can secure the support rigidity of the suspension cross member during the normal vehicle traveling and achieve the smooth retreat of the power unit to restrain the collision load from having bad influence on passengers in the vehicle frontal collision.

According to the present invention, there is provided a lower structure of an automotive vehicle, comprising a suspension cross member provided behind a power unit and extending in a vehicle width direction, a plate-shaped vehicle-body-side support portion supporting the suspension cross member, a pair of pin and bolt hole provided either the vehicle-body-side support portion or a plate-shaped supported portion of the suspension cross member, a pair of through hole and bolt hole provided the other of the vehicle-body-side support portion or the plate-shaped supported portion of the suspension cross member, and a pair of bolt and nut, wherein the vehicle-body-side support portion and the plate-shaped supported portion of the suspension cross member are fastened with the pair of bolt and nut in a state in which the bolt of the pair of bolt and nut is inserted into both of the bolt holes of the pair of pin and bolt hole and the through hole and bolt hole and the pin of the pair of pin and bolt hole is inserted into the through hole of the pair of through hole and bolt hole.

According to the present invention, the support rigidity, in a direction perpendicular to the pin, of the periphery of the respective bolt holes can be secured by the insertion of the pin into the through hole and a fastening force of the bolt during the normal vehicle traveling. In the vehicle frontal collision, meanwhile, this support rigidity can be properly decreased by expanding the through hole by the moving pin in the vehicle frontal collision, so that a load which may be required to extract the bolt from the vehicle body can be lowered. Accordingly, the load required to detach the suspension cross member from the vehicle body can be decreased. Consequently, the retreat of the power unit can be conducted smoothly without being hindered by the suspension cross member, so that it can be properly restrained that the collision load has the bad influence on passengers According to an embodiment of the present invention, the suspension cross member has, in the vicinity of the supported portion thereof, a weak portion which deforms so that a slant of the supported portion of the suspension cross member relative to the vehicle-body-side support portion increases when the suspension cross member moves back according to a retreat of the power unit. Thereby, a torsional load for the bolt can be increased, so that the bolt can be extracted from the vehicle body easily.

According to another embodiment of the present invention, the diameter of the pin is substantially the same as the diameter of the through hole, or the pin is a positioning pin of the suspension cross member for a vehicle body and the through hole is a positioning hole. Thereby, a member necessary for positioning of the suspension cross member and a member to decrease the support rigidity of the periphery of the bolt holes can be common to each other.

According to another embodiment of the present invention, either the nut or a head portion of the bolt of the pair of bolt and nut is provided at the vehicle-body-side support portion, and the supported portion of the suspension cross member has a rigidity which is greater than that of the vehicle-body-side support portion. Thereby, the through hole can be expanded easily by the move of the pin provided at the supported portion having the high rigidity. Herein, it may be considered that the pin is provided at the vehicle-body-side support member. Herein, since the suspension cross member receives the load from the suspension and transmits the load to the vehicle body with dispersion, there may be a case in which the thickness of the vehicle-body-side support member is set to be greater than that of a major part of the vehicle body. In this case, it may be necessary to make the rigidity of the vehicle-body-side support member higher in order to expand the through hole easily, so that the heavy weight of the vehicle body may be caused by the greater thickness of the vehicle-body-side support member and so on. By contrast, according to this embodiment, both lightening the vehicle weight and easily expanding the through hole in the vehicle frontal collision can be achieved.

According to another embodiment of the present invention, either a seat face of the nut or a head portion of the bolt of the pair of bolt and nut is provided is arranged around the bolt hole of the pair of through hole and bolt hole, and the through hole of the pair of through hole and bolt hole is located in the vicinity, in the vehicle width direction, of an arrangement position of the seat face of the nut or the head portion of the bolt within a range of 10 mm or smaller. Thereby, the rigidity of the above-described seat face can be decreased securely.

According to another embodiment of the present invention, a gap between the bolt and either the bolt hole of the pair of pin and bolt hole or the bolt hole of the pair of through hole and bolt hole is set to be greater than a gap between the pin and the through hole so that the pin contacts the through hole before the bolt contacts the bolt hole of the pair of pin and bolt hole or the bolt hole of the pair of through hole and bolt hole when the suspension cross member moves back according to a retreat of the power unit. Thereby, any contact of the bolt with an edge portion of the bolt holes can be avoided by the above-described greater gap when the suspension cross member starts moving back in the vehicle frontal collision, so that the stress can concentrate at the through hole first. Accordingly, the through hole can be expanded securely by the pin before the bolt holes are expanded by the bolt.

According to another embodiment of the present invention, the suspension cross member comprises a suspension cross member body supporting a suspension arm and a vertical member extending upwardly from the suspension cross member body, and the supported portion of the suspension cross member is provided at the suspension cross member body. Thereby, the number of portions where tolerances between the suspension arm and the pin occur can be decreased, so that the accuracy of positioning the suspension cross member can be improved.

Other features, aspects, and advantages of the present invention will become apparent from the following description which refers to the accompanying drawings.

BRIEF DESCRIPTION OF THE DRAWINGS

FIG. 12A is a plan view showing an operation in an initial stage of occurrence of a vehicle frontal collision, and FIG. 12B is a plan view showing an operation in a late stage of occurrence of the vehicle frontal collision.

FIG. 20 is a perspective view showing a modification of the embodiment of the present invention.

DETAILED DESCRIPTION OF THE INVENTION

Hereinafter, preferred embodiments of the present invention will be described referring to the accompanying drawings.

Embodiment 1

Figure 1:
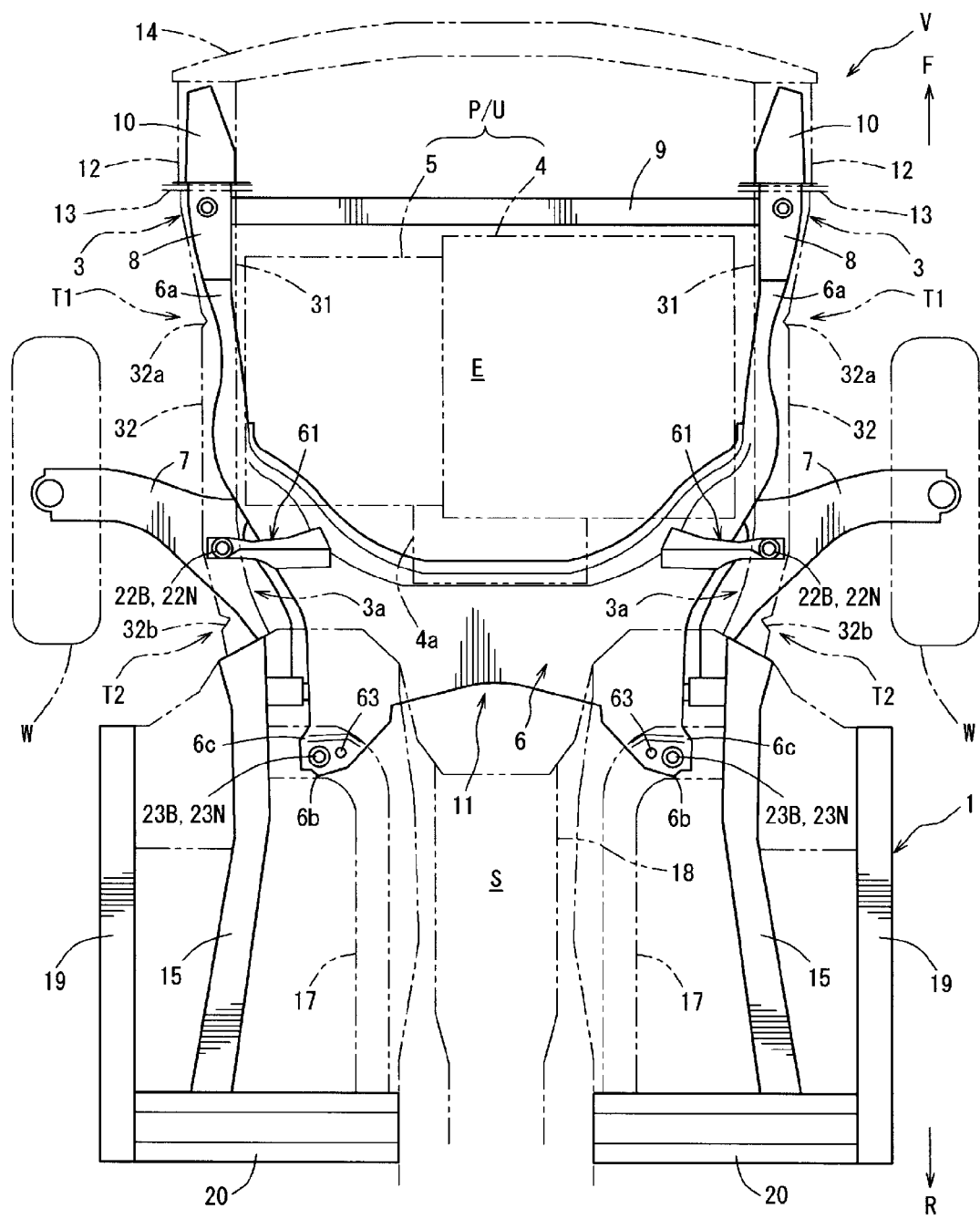
FIG. 1 is a plan view showing a lower structure of an automotive vehicle according to a first embodiment of the present invention.
Figure 2:
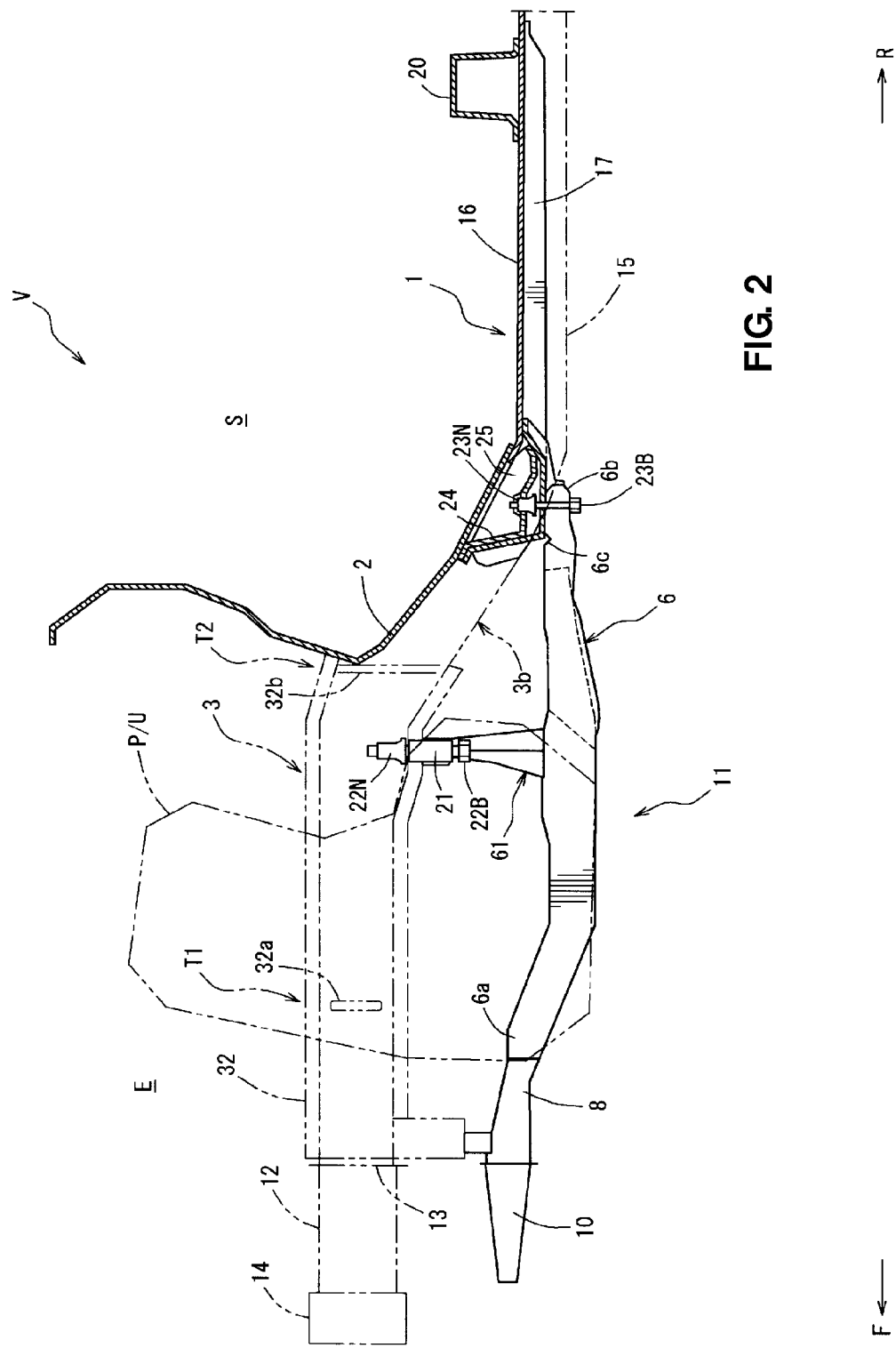
FIG. 2 is a side sectional view showing the lower structure of an automotive vehicle according to the first embodiment of the present invention.

FIG. 1 is a plan view showing a lower structure of an automotive vehicle according to a first embodiment of the present invention, and FIG. 2 is a side sectional view showing the lower structure of an automotive vehicle. As shown in FIGS. 1 and 2, a vehicle body 1 of a vehicle V comprises a dash panel 2 (see FIG. 2) which partitions an engine room E from a vehicle room S and a pair of front side frames 3 which is provided in front of the dash panel 2. An arrow F shows a vehicle forward direction and an arrow R shows a vehicle rearward direction in the figures.

Between the pair of front side frames 3 is provided the engine room E, where a power unit P/U which comprises an engine 4, a transmission 5 and so on is arranged. Reference numeral 4a in FIG. 1 denotes an exhaust system of the engine 4. Herein, the present invention should not be limited to the vehicle equipped with the power unit P/U comprising the engine 4, but is applicable to any vehicle which is equipped with a motor, a fuel cell or the like.

The vehicle body 1 comprises a suspension cross member body 6 which extends in a vehicle width direction, a pair of suspension arms 7 (see FIG. 1) which couples swingably each end portion of the suspension cross member body 6 to each front wheel W illustrated by two-dotted broke lines in FIG. 1, a pair of engine support members 8 which is arranged in a vehicle longitudinal direction, a front cross member 9 which interconnects front end portions of the engine support members 8, a pair of cylindrical lower crush cans 10 which is fixed to each front end of the engine support member 8, and so on.

In the present embodiment, a suspension cross member 11 is comprised of the suspension cross member body 6, the engine support members 8, and the front cross member 9. The suspension cross member 11 is a so-called perimeter frame, which extends in back of and below the power unit P/U. Herein, illustration of the suspension arms 7 is omitted in FIG. 2 for convenience.

The front side frames 3 extend in the vehicle longitudinal direction from a front portion of the vehicle room S at both sides of the engine room E as shown in FIG. 2. Further, the front side frames 3 extend substantially horizontally rearwardly from the front end of the vehicle V as shown in FIG. 1, and each of these members 3 has a bending portion 3a which bends inwardly in a plan view at a middle portion of its rear-end side which corresponds to the suspension cross member body 6.

The front side frame 3 comprises an inner panel 31 on an inward inside and an outer panel 32 on an outward side, and has a closed cross section. The front side frame 3 has an opening portion at its front end which is formed by the inner and outer panels 31, 32. To the front end of each front side frame 3 is fixed an attachment portion 13 of a cylindrical upper crush can 12. Further, to both front ends of the upper crush cans 12 is fixed a bumper reinforcement 14 which extends in the vehicle width direction at its both side end portions.

The outer panel 32 of the front side frame 3 has, as shown in FIGS. 1 and 2, a first outer bead 32a and a second outer bead 32b which extend vertically, respectively.

The first outer bead 32a is a concaved bead which is concaved inwardly and formed at a specified position in front of the middle portion of the outer panel 32, which is able to bend inwardly in the frontal collision of the vehicle V (see FIG. 12). Thus, an inwardly bending portion T1 is formed at the outer panel 32 at a position of the first outer bead 32a.

Further, as shown in FIGS. 1 and 2, the second outer bead 32b is a concaved bead which is concaved inwardly and formed at a specified in back of the middle portion of the outer panel 32, which is able to bend inwardly in the frontal collision of the vehicle V (see FIG. 12). Thus, an inwardly bending portion T2 is formed at the outer panel 32 at a position of the first outer bead 32a.

Each front side frame 3 has a kick-up portion 3b, and a rearward portion of the front side frame 3 from this kick-up portion 3b slants downwardly as shown in FIG. 2. A rear end portion of each front side frame 3 connects to a floor frame 15 which extends in the vehicle longitudinal direction. A floor panel 16 is joined onto the both floor panels 15, and a front edge of the floor panel 16 connects to the dash panel 2.

Further, a pair of tunnel frames 17 is provided inside the floor frames 15 so as to extend substantially in parallel to the frame 15 as shown in FIGS. 1 and 2. Each tunnel frame 17 bends outwardly, in the vehicle width direction, at its front end portion, and this bending portion is positioned almost right above a rear end portion of the suspension cross member body 6 of the suspension cross member 11. These floor frame 15 and tunnel frame 17 have a U-shaped cross section, respectively, thereby forming a closed cross section extending in the vehicle longitudinal direction together with the floor panel 16.

Moreover, a tunnel portion 18 which extends longitudinally is formed at a central portion of the floor panel 16 as shown in FIG. 1. This tunnel portion 18 projects upwardly toward the inside of the vehicle room, which is a center of the vehicle rigidity.

A pair of side sills 19 extending longitudinally is fixed to both sides of the floor panel 16 as shown in FIG. 1. Floor cross members 20, 20 are provided to interconnect both-side longitudinal walls of the tunnel portion 18 and the side sills 19, 19. These floor cross members 20, 20 have a U-shaped cross section, respectively, thereby forming a closed cross section extending in the vehicle width direction together with the floor panel 16.

Figure 3:
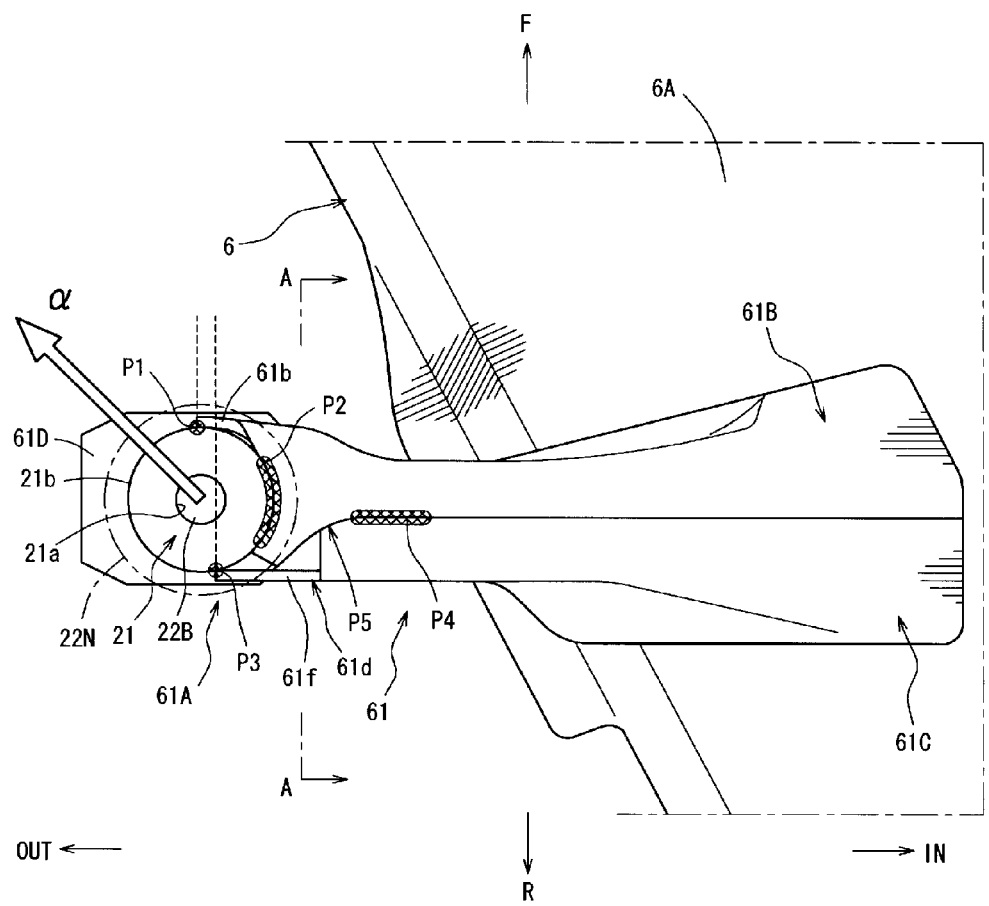
FIG. 3 is a plan view showing a middle-portion attaching member and its surrounding portion.
Figure 4:
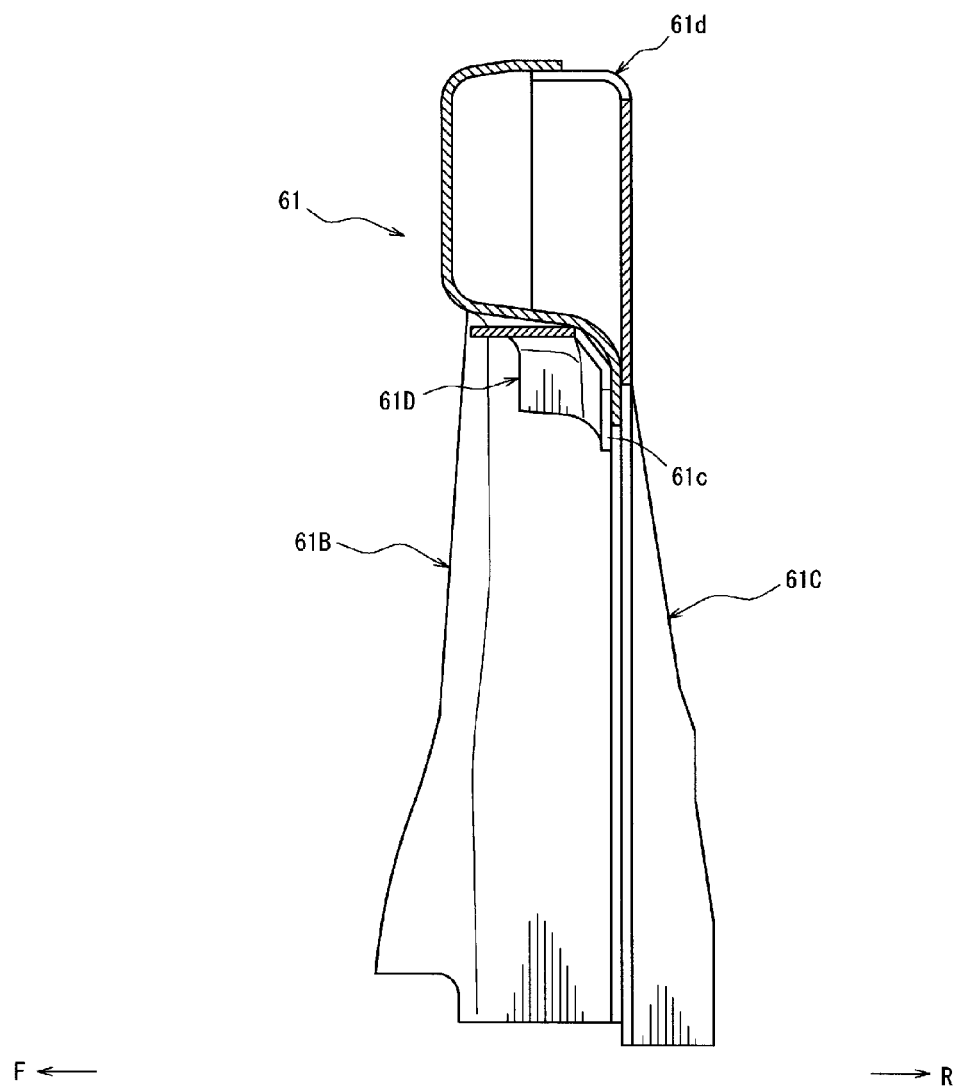
FIG. 4 is a sectional view taken along line A-A of FIG. 3.
Figure 5:
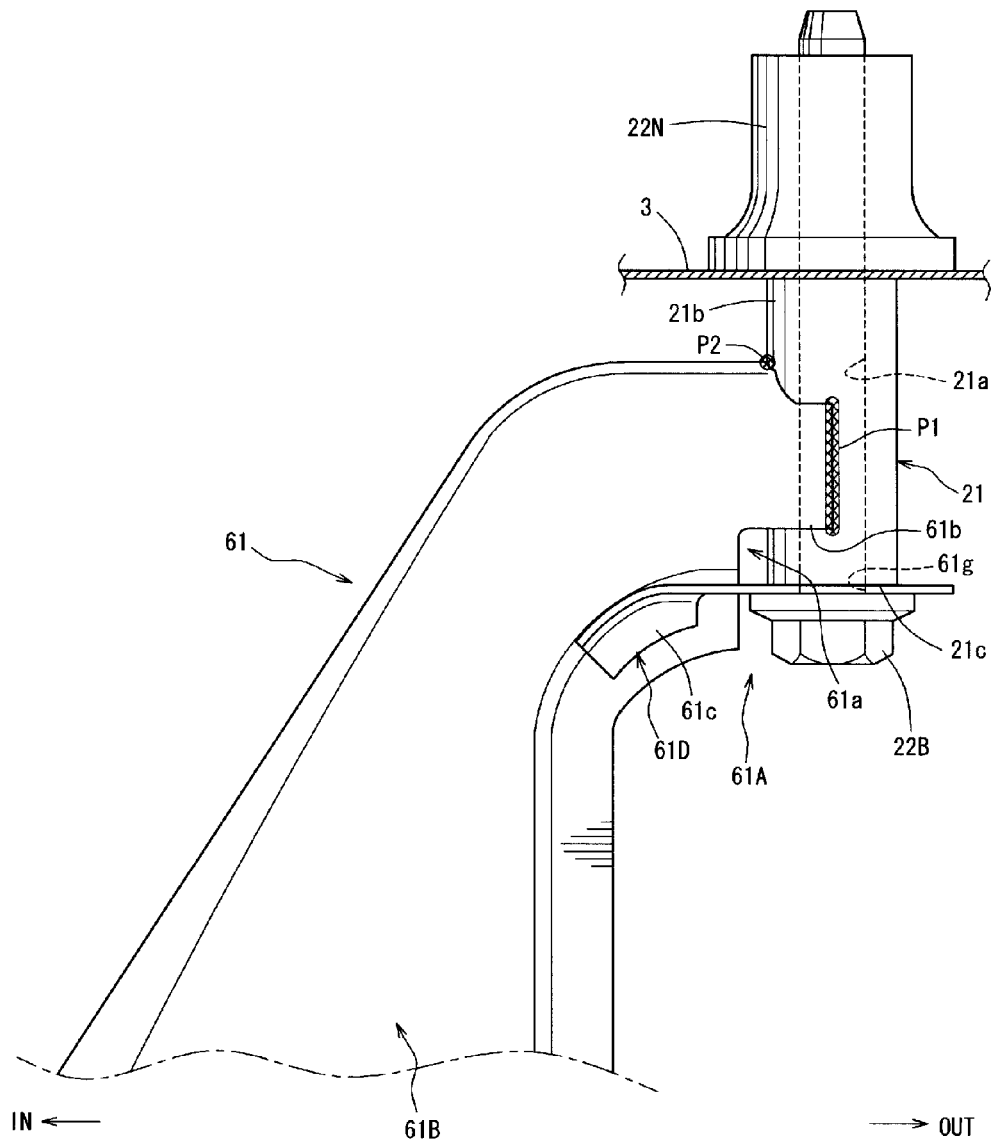
FIG. 5 is a side view of the middle-portion attaching member, when viewed from side.
Figure 6:
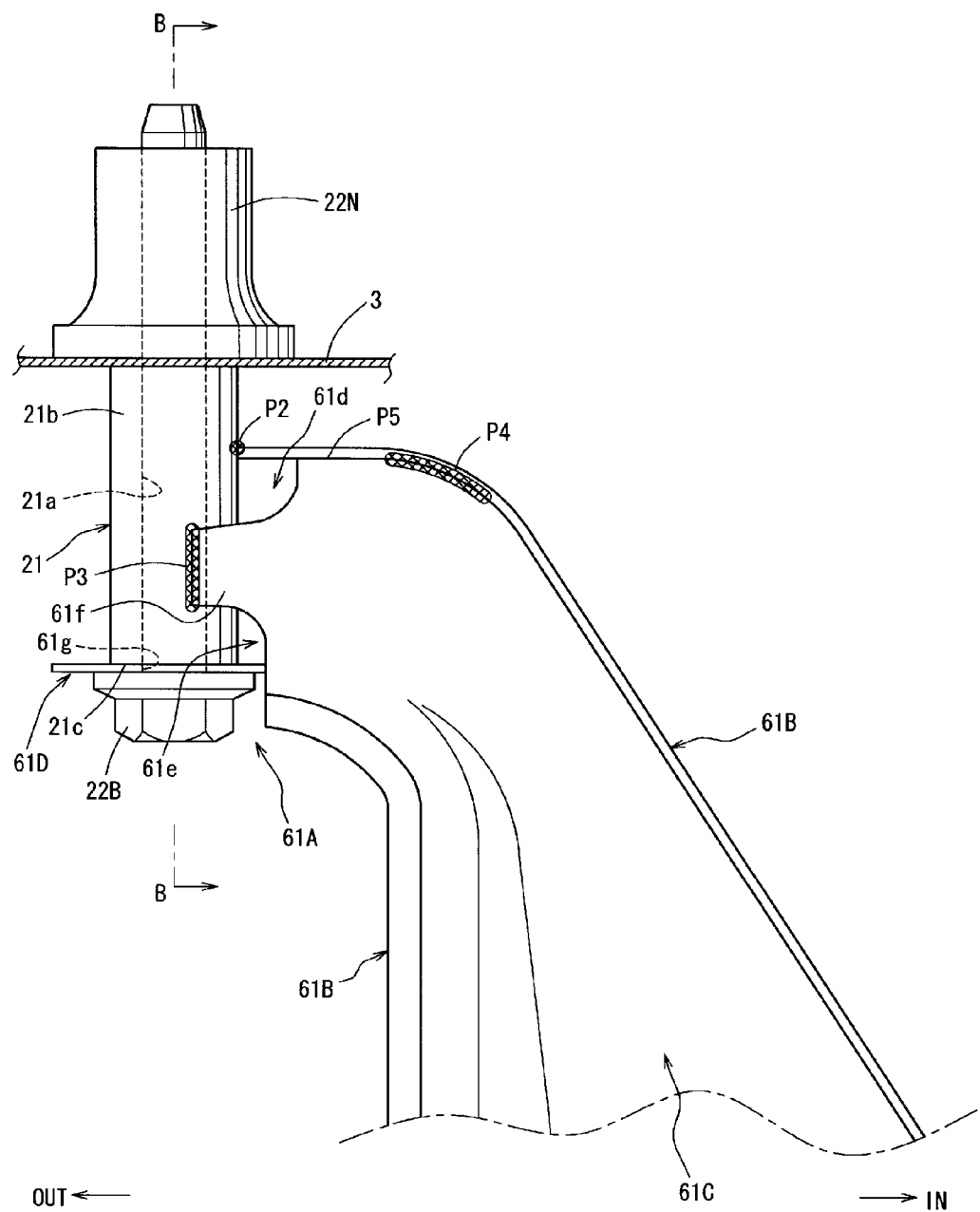
FIG. 6 is a side view of the middle-portion attaching member, when viewed from rear.
Figure 7:
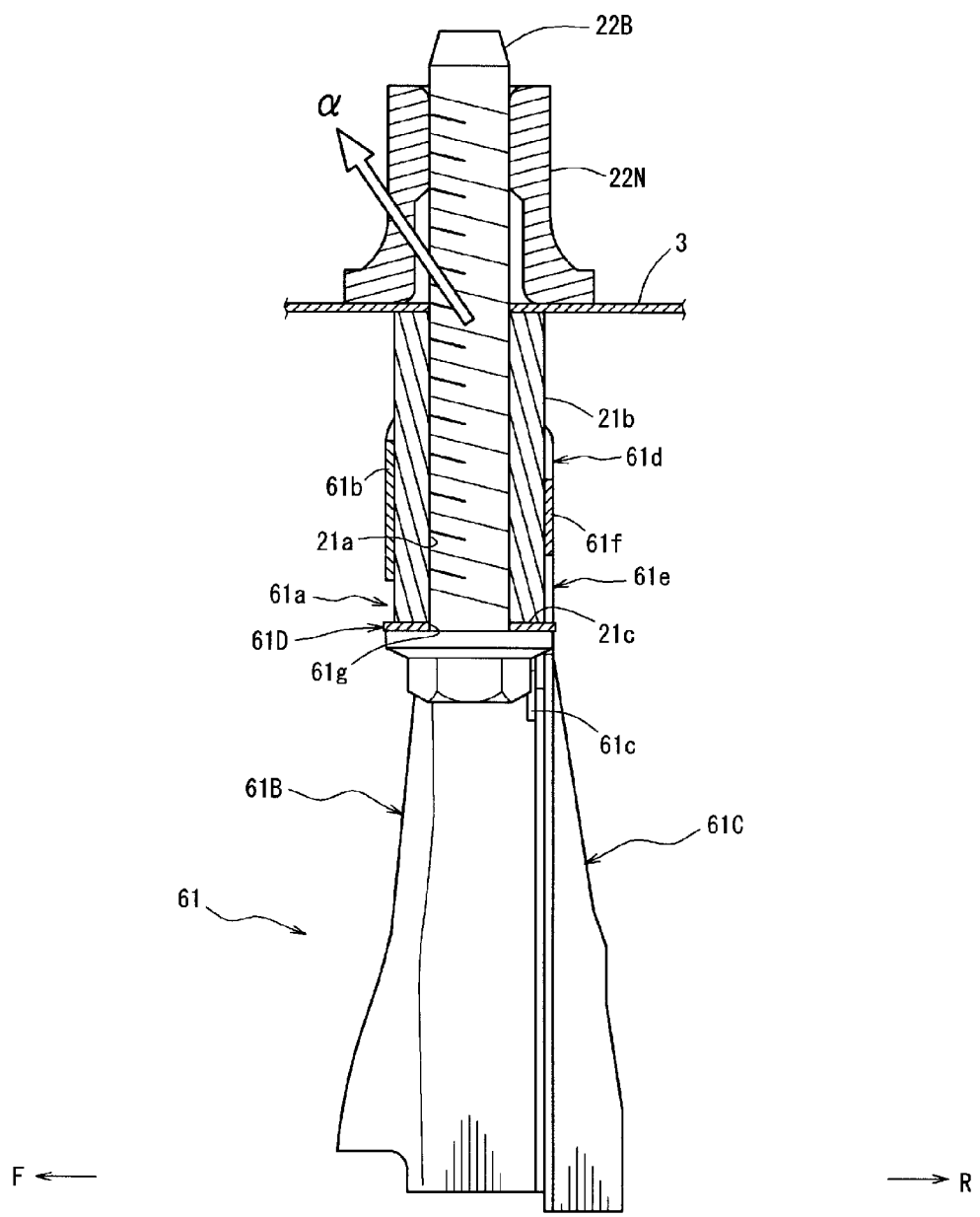
FIG. 7 is a sectional view taken along line B-B of FIG. 6.

The suspension cross member body 6 of the suspension cross member 11 has a pair of middle-portion attaching members 61 which extends outwardly, in the vehicle width direction, from its middle portion and upwardly. Herein, FIG. 3 is a plan view showing the middle-portion attaching member 61 and its surrounding portion. FIG. 4 is a sectional view taken along line A-A of FIG. 3. FIG. 5 is a side view of the middle-portion attaching member 61, when viewed from side. FIG. 6 is a side view of the middle-portion attaching member 61, when viewed from rear. FIG. 7 is a sectional view taken along line B-B of FIG. 6. An arrow IN shows a vehicle inward direction, and an arrow OUT shows a vehicle outward direction in the figures.

The middle-portion attaching member 61 is a vertical member, which is different from the suspension cross member body 6 and has a substantially reverse-L shape in a front or rear view as shown in FIGS. 1 through 7. This middle-portion attaching member 61 extends vertically and its lower portion connects to the suspension cross member body 6. A tip portion of its upper portion bends outwardly and constitutes a support portion 61A to support a pipe-shaped attaching member 21 which extends vertically.

The pipe-shaped attaching member 21 has a hollow portion 21a extending vertically, into which a bolt 22B is inserted. This bolt 33B engages with a pipe-shaped weld nut 22N which is joined to a lower end face of the front side frame 3, thereby the suspension cross member 11, which comprises the suspension cross member body 6, the middle-portion attaching member 61 and so on, is fastened and fixed to the middle portion of the front side frame 3 via the pipe-shaped attaching member 21.

Herein, the pipe-shaped attaching member 21 is fixed to a specified position of the front side frame 3 which is located between the first and second outer beads 32a, 32b in the vehicle longitudinal direction.

Meanwhile, the middle-portion attaching member 61 is mainly comprised of a front-side panel member 61B and a rear-side panel member 61C, which are formed in a substantially reverse-L shape, respectively, and form a closed cross section together as shown in FIG. 4.

Herein, a lower end portion of the front-side panel member 61B is joined to an upper panel member 6A of the suspension cross member body 6 as shown in FIG. 3, and a tip portion of its upper portion constitutes part of the support portion 61A and extends outwardly. The tip portion of the front-side panel member 61B is joined and fixed to a side face portion 21b of the pipe-shaped attaching member 21, thereby supports this.

A notch 61a which extends inwardly from the pipe-shaped attaching member 21 between its front portion and its lower portion is formed at the tip portion (support portion 61A) of the front-side panel member 61B as shown in FIG. 5. Further, a joint piece 61b which projects outwardly is formed at an upper portion of the front-side panel member 61B.

This joint piece 61b is joined and fixed to a front portion of the side face portion 21b of the pipe-shaped attaching member 21 at a specified joint portion P1 (see a shading portion in FIGS. 3 and 5).

An upper edge portion of the tip portion of the front-side panel member 61B is formed in an arc shape so as to correspond to the shape of the pipe-shaped attaching member 21 as shown in FIG. 3. This arc-shaped upper edge portion is joined and fixed to an inward portion of the side face portion 21b of the pipe-shaped attaching member 21 at a joint portion P2 shown in FIG. 3.

As shown in FIGS. 4, 5 and 7, a lower support member 61D is attached to the tip portion of the front-side panel member 61B which is different from the front-side and rear-side panel members 61B, 61C. This lower support member 61D has a joint flange 61c which is formed on its inside, and this joint flange 61c is joined to a side face of the front-side panel member 61B.

A tip portion of the lower support member 61D extends outwardly from the joint flange 61c and projects in the vehicle width direction from the side face of the front-side panel member 61B. The tip portion of the lower support member 61D is formed in a flat plate shape, and a lower portion 21c of the pipe-shaped attaching member 21 is placed on this tip portion of the lower support member 61D. The tip portion of the lower support member 61D is fastened to the lower portion 21c of the pipe-shaped attaching member 21 only by the bolt 22B and the weld nut 22N, not via fixed connection by welding.

Meanwhile, the lower end portion of the rear-side panel member 61C is joined to the upper panel member 6A as shown in FIG. 3, and the tip portion of its upper portion constitutes part of the support portion 61A and extends outwardly in the vehicle width direction. The tip portion of the rear-side panel member 61C is joined and fixed to the side face portion 21b of the pipe-shaped attaching member 21, thereby supports it.

Notches 61d, 61e which extend inwardly from the pipe-shaped attaching member 21 between its rear portion and its lower portion are formed at the tip portion (support portion 61A) of the rear-side panel member 61C as shown in FIG. 6. Further, a joint piece 61f which projects outwardly is formed at a middle portion of the rear-side panel member 61C.

This joint piece 61f is joined and fixed to a front portion of the side face portion 21b of the pipe-shaped attaching member 21 at a specified joint portion P3 (see a shading portion in FIGS. 3 and 6).

Herein, the front-side and rear-side panel members 61B, 61C are joined to each other at a specified joint portion P4 (see a shading portion in FIGS. 3 and 6) which is inwardly away from the notch portion 61d of the rear-side panel member 61C. Meanwhile, the upper portions of the front-side and rear-side panel members 61B, 61C have a specified distance non-joint portion P5 near the pipe-shaped attaching member 21 as shown in FIGS. 3 and 6.

The tip portion of the joint piece 61b is positioned outwardly from the tip portion of the joint piece 61f as shown in FIG. 3.

Further, as shown in FIG. 7, the lower end portion of the joint piece 61f is positioned upwardly from the lower end portion of the joint piece 61b. Thereby, the lower end portion of the joint portion P3 where the rear portion of the side face portion 21b is supported at the support portion 61A is positioned upwardly from the lower end portion of the joint portion P1 where the front portion of the side face portion 21b is supported at the support portion 61A.

Thus, the inward portion, front portion and rear portion of the side face portion 21b of the pipe-shaped attaching member 21 are joined to the joint piece 61b of the front-side panel member 61B, the upper edge portion of the front-side panel member 61B, and the joint piece 61f of the rear-side panel member 61C. Meanwhile, the lower portion 21c of the pipe-shaped attaching member 21 is fastened together with the tip portion of the lower support member 61D through a non-fixing state. Thereby, the lower portion 21c of the pipe-shaped attaching member 21 is supported with a specified support rigidity which is lower than that of the inward portion, front portion and rear portion of the side face portion 21b in the vehicle longitudinal direction. Herein, reference numeral 61g denotes a through hole for the bolt 22B which is formed at the lower support member 61D.

Figure 8:
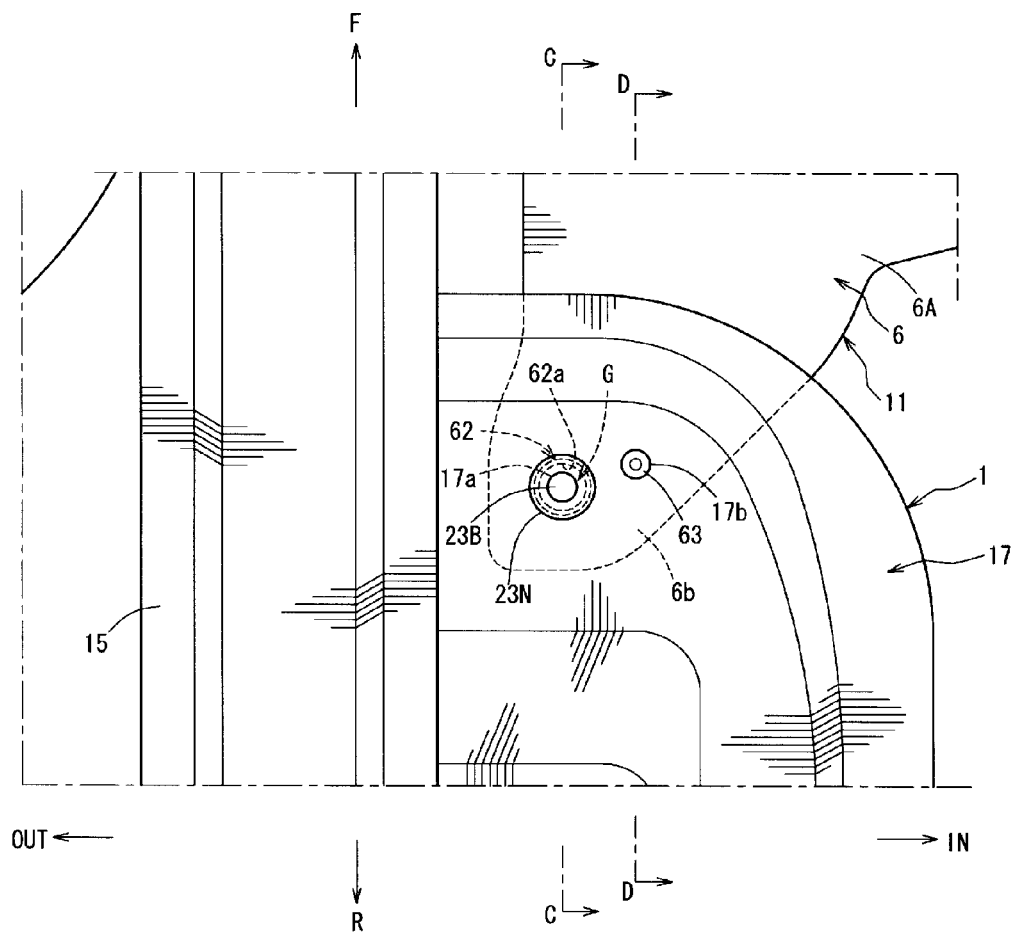
FIG. 8 is a plan view showing a rear-portion attachment face portion of a suspension cross member body and its surrounding portion.
Figure 9:
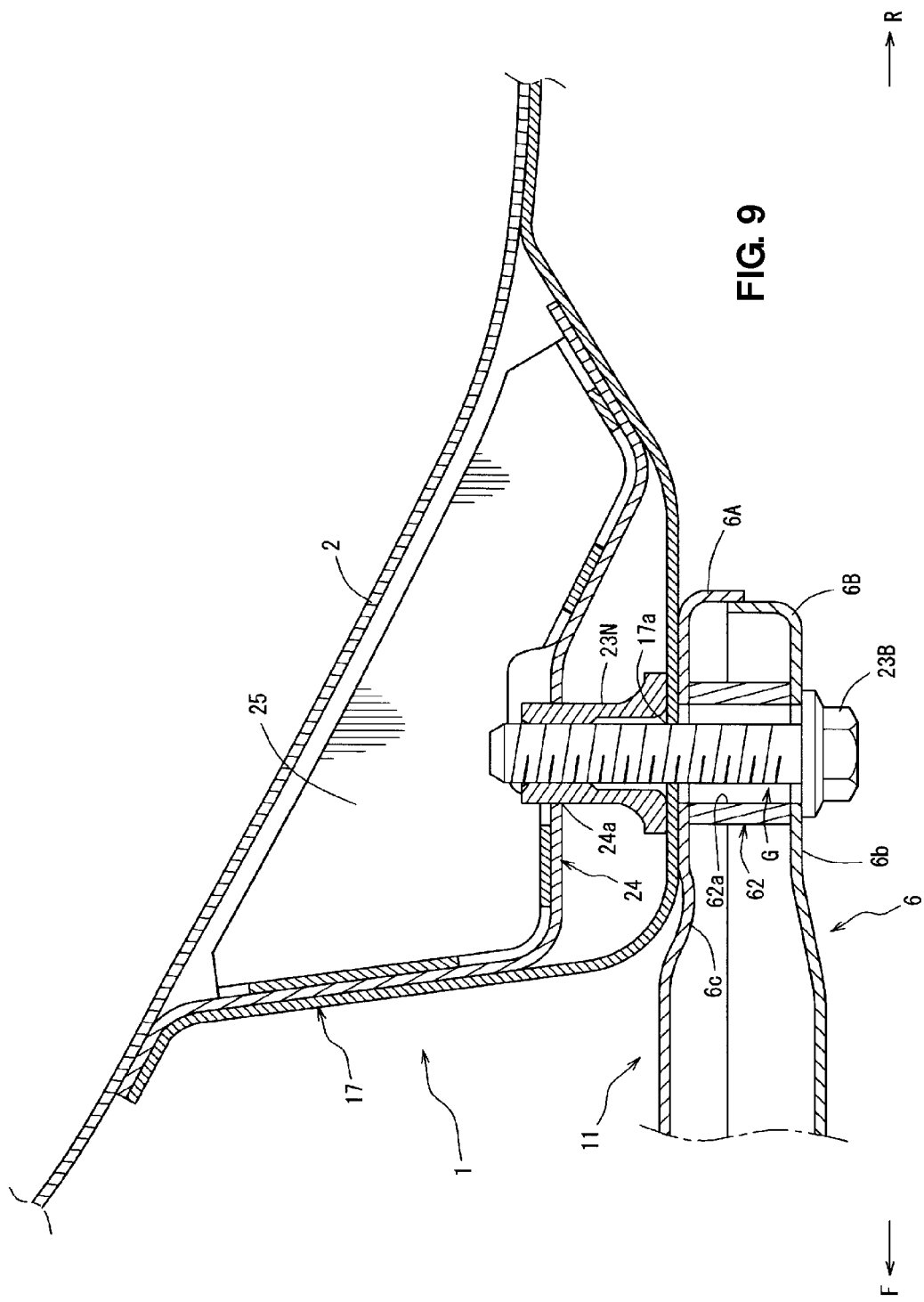
FIG. 9 is a sectional view taken along line C-C of FIG. 8.
Figure 10:
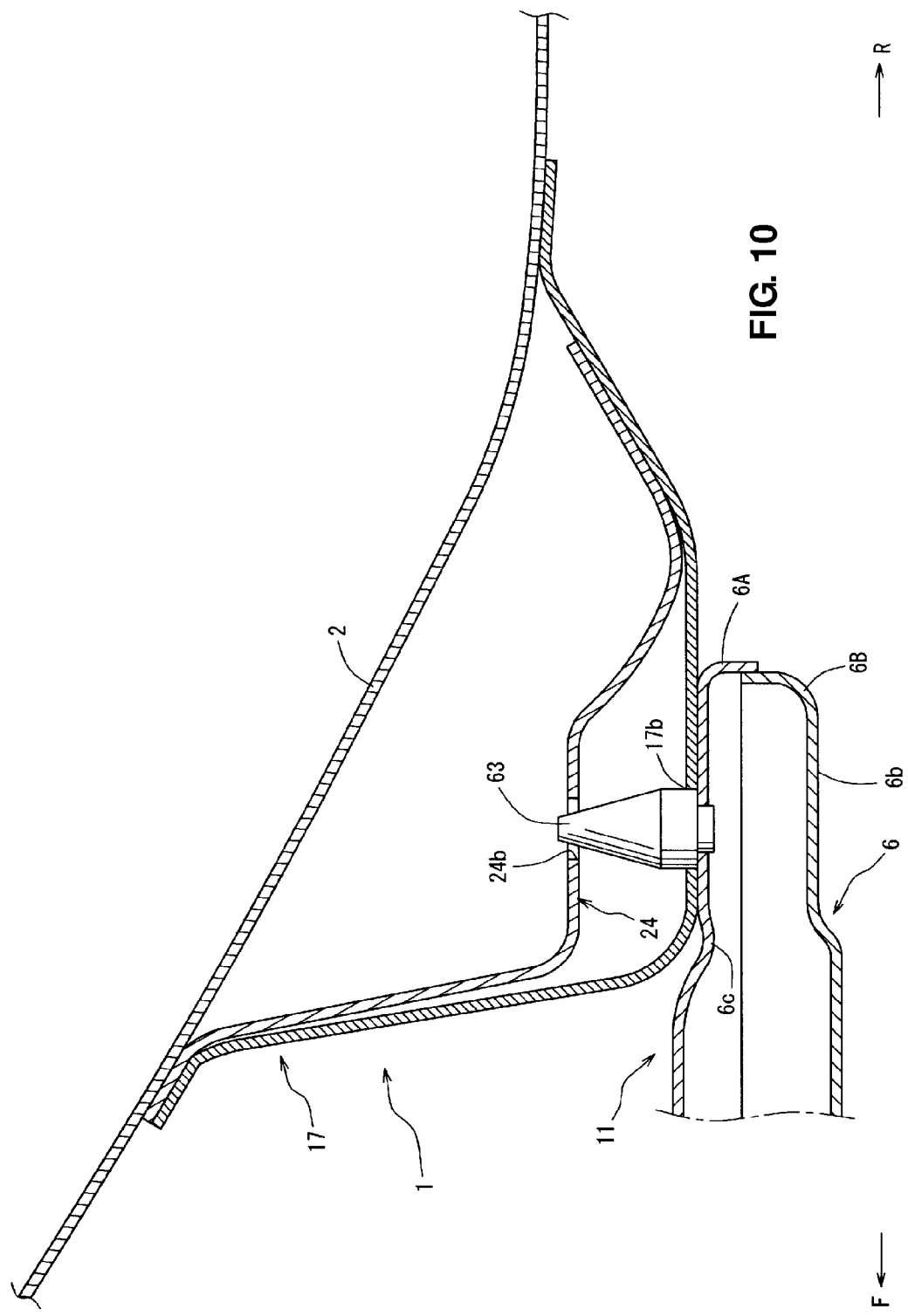
FIG. 10 is a sectional view taken along line D-D of FIG. 8.
Figure 11:
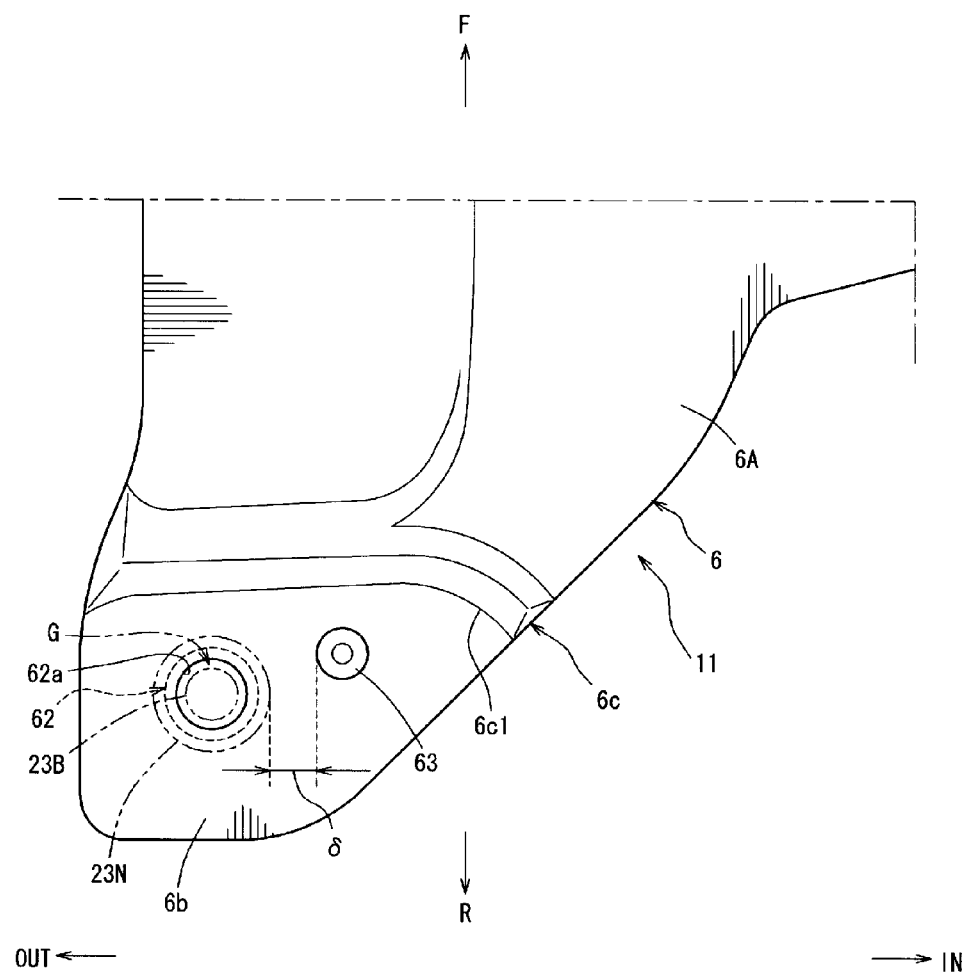
FIG. 11 is a plan view showing the rear-portion attachment face portion of the suspension cross member body.

Hereinafter, the structure of the suspension cross member body 6 and its attachment structure will be described specifically referring to FIGS. 8 through 11. FIG. 8 is a plan view showing the rear-portion attachment face portion 6b of the suspension cross member body 6 and its surrounding portion. FIG. 9 is a sectional view taken along line C-C of FIG. 8. FIG. 10 is a sectional view taken along line D-D of FIG. 8. FIG. 11 is a plan view showing the rear-portion attachment face portion 6b of the suspension cross member body 6. The suspension cross member body 6 comprises, as shown in FIGS. 1, 2 and 8 through 11, a pair of engine support attachment portions 6a which is provided at its front end portion and a pair of rear-portion attachment face portions 6b which is provided at its rear end portion.

The suspension cross member body 6 is, as shown in FIGS. 9 and 10, comprised of the plate-shaped upper panel member 6A and the lower panel member 6B which are joined to each other and form a closed cross section.

The rear-portion attachment portion 6b of the suspension cross member body 6 is formed in a plate shape by the upper and lower panel members 6A, 6B. A bolt 23B engages with a pipe-shaped weld nut 23N which is joined to a lower end face of the tunnel frame 17, thereby the rear-portion attachment portion 6b of the suspension cross member body 6 is fastened and fixed to a lower end face of the above-described bending portion of the tunnel frame 17. Thus, the rear end portion of the suspension cross member 11 is supported at the vehicle body 1 via the tunnel frame 17.

As shown in FIGS. 9 and 10, the tunnel frame 17 is joined to the dash panel 2 at both end portions of its front portion so as to form a closed cross section together with the dash panel 2. In the present embodiment, the rigidity of the rear-portion attachment face portion 6b is set to be greater than that of the tunnel frame 17. Herein, setting this rigidity may be achieved by increasing the thickness, using a high tension material, forming a bead extending in a direction of requiring a high rigidity, reinforcing with a reinforcing member, such as a collar member, or the like.

Inside the closed cross section between the tunnel frame 17 and the dash panel 2 are arranged a first reinforcement 24 which has a U-shaped cross section like the tunnel frame 17 and a higher rigidity than the tunnel frame 17, and a second reinforcement 25 which stands upwardly from a lower face portion of the first reinforcement 24 (see FIG. 9).

Herein, the tunnel frame 17 and the first reinforcement 24 have a bolt hole 17a and a through hole 24a, respectively. The bolt 23B is inserted into the bolt hole 17a, and the weld nut 23N is inserted into the through hole 24a. This weld nut 23N is fixed at a specified position by a lower end face of the tunnel frame 17 and the through hole 24a of the first reinforcement 24.

Meanwhile, to the rear-portion attachment face portion 6b is fixed a collar member 62 which has a bolt hole 62a extending vertically therein as shown in FIGS. 8, 9 and 11. The bolt 23B is inserted into the collar member 62, and the diameter of the bolt hole 62a is set to be greater than that of the bolt 23B so that some gap G is formed in front between the collar member 62 and the bolt 23B.

Further, a positioning pin 63 is provided at a specified position of the rear-portion attachment face portion 6b which is located beside the bolt hole 62a substantially in the vehicle width direction. Specifically, this positioning pin 63 is positioned beside the bolt hole 62a substantially in the vehicle width direction, but slightly in front of the bolt hole 62a in the vehicle longitudinal direction. The positioning pin 63 has a cone-shaped tip and projects toward the tunnel frame 17. Meanwhile, the tunnel frame 17 and the first reinforcement 24 have a positioning hole 17b and a through hole 24b at respective positions which correspond to the positioning pin 63 as shown in FIG. 10.

The diameter of the positioning hole 17b is set to be substantially the same as that of the positioning pin 63 so that no gap is formed between these pin and holes 63, 17b in the normal state. Accordingly, according to the present embodiment, the forward gap G between the collar member 62 and the bolt 23B is set to be greater than that between the positioning hole 17b and the positioning pin 63.

Herein, the positioning pin 63 and the positioning hole 17b are used for positioning the suspension cross member 11 relative to the vehicle body 1. That is, when the suspension cross member 11 is attached (assembled) to the vehicle body 1, the positioning pin 63 is inserted into the positioning hole 17b of the tunnel frame 17 on the side of the vehicle body 1, so that the positioning of the rear-portion attachment face portion 6b to the vehicle body 1 can be conducted. Consequently, the suspension cross member 11 can be attached (assembled) to the vehicle body 1 at a right position securely.

Further, according to the present embodiment, the seat face of the weld nut 23N is arranged around the bolt hole 17a of the tunnel frame 17 so that it is located in the vicinity of or overlapped with the bolt hole 17a within a range of 10 mm or smaller from the positioning hole 17b in the vehicle width direction (see a distance δ in FIG. 11).

Herein, it may be considered that the positioning of the suspension cross member 11 to the vehicle body 1 is conducted by using a fastening bolt to connect the suspension cross member 11 to the vehicle body 1 in place of the above-described positioning pin 63. However, since the suspension cross member 11 is formed by the upper and lower panel members, such as the suspension cross member body 6, with a specified height vertically, a rather long bolt may be necessary because such fastening bolt may require an upper end which projects upwardly beyond the suspension cross member in order to function as a positioning member. In this case, the rather long bolt would cause increase of manufacturing costs or vehicle weight improperly.

Further, the positioning of the suspension cross member has been recently conducted by using a fastening bolt and nut of the suspension cross member having taper. However, the fastening bolt and nut with taper has not been set yet as a world-wide standard, so such parts need to be obtained as a particular order parts. Accordingly, the positioning of the suspension cross member by using the fastening bolt and nut with taper would not be superior in mass production.

Moreover, it may be considered that some counterpart of the positioning pin 63 is provided at the middle-portion attaching member 61, for example, other than the rear-portion attachment face portion 6b. However, if some tolerance occurs in case the middle-portion attaching member 61 and the suspension cross member 6 are joined together, an appropriate positioning of the suspension cross member body 6 relative to the vehicle body 1 would not be achieved by this tolerance occurring even if the positioning between the front side frame 3 (vehicle body 1) and the middle-portion attaching member 61 is conducted by the positioning pin or the like. Accordingly, in this case, the accuracy of positioning would be deteriorated.

For these reasons described above, in the present embodiment, the positioning pin 63 is provided at the rear end portion of the suspension cross member body 6, and this positioning pin 63 is inserted into the positioning hole 17b of the tunnel frame 17 on the side of the vehicle body 1. Thereby, the positioning of the rear-portion attachment face portion 6b relative to the vehicle body 1 becomes possible, so that the positioning of the suspension cross member 11 relative to the vehicle body 1 can be conducted properly.

Further, a bead 6c which crosses over in the vehicle width direction is formed in the vicinity of the rear-portion attachment face portion 6b as shown in FIGS. 1, 2 and 9 through 11. This bead 6c is a concaved bead which is formed by part of the upper face portion of the upper panel member 6A which is concaved downwardly. The bead 6c is located in front of and substantially in parallel to a line connecting the positioning pin 63 and the bolt hole 17a. The bead 6c has a slant portion 6c1 near the positioning pin 63 and its extending direction bends as illustrated.

Figure 13A:
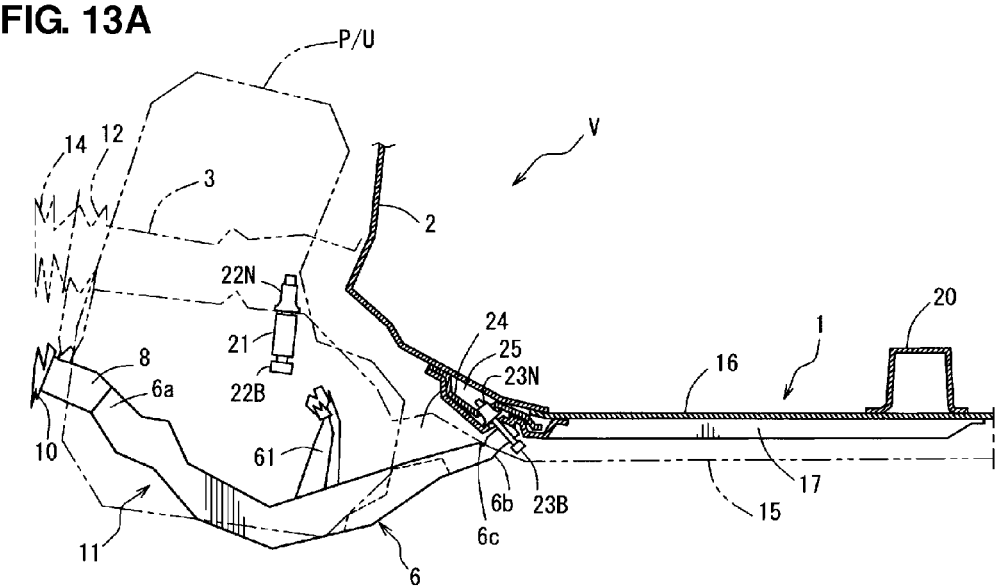
FIG. 13A is a side sectional view showing the operation in the initial stage of occurrence of the vehicle frontal collision.
Figure 13B:
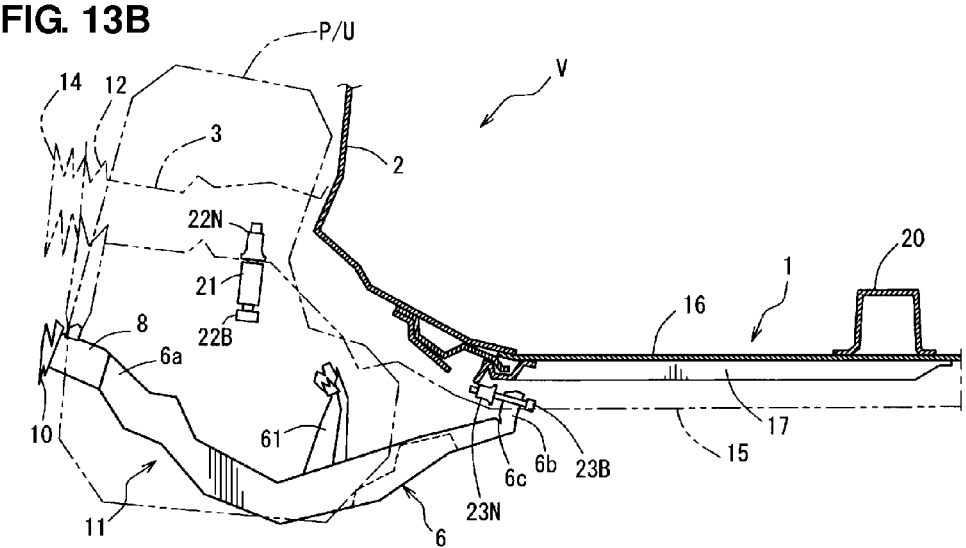
FIG. 13B is a side sectional view showing the operation in the late stage of occurrence of the vehicle frontal collision.

Hereinafter, the operation of the vehicle V in the vehicle frontal collision will be described specifically referring to FIGS. 12A, B and 13A, B. FIG. 12A is a plan view showing an operation in an initial stage of occurrence of the frontal collision of the vehicle V, and FIG. 12B is a plan view showing an operation in a late stage of occurrence of the frontal collision of the vehicle V. FIG. 13A is a side sectional view showing the operation in the initial stage of occurrence of the frontal collision of the vehicle V, and FIG. 13B is a side sectional view showing the operation in the late stage of occurrence of the frontal collision of the vehicle V. Illustration of the suspension arm 7 is omitted for convenience in these figures.

First, in the initial stage of the occurrence of the frontal collision of the vehicle V, as shown in FIGS. 12A and 13A, the lower and upper crush cans 10, 20 provided at the front end portion of the front side frame 3 are crushed by the collision load. Some collision load which has not been absorbed through crush deformations of these crush cans 10, 20 is inputted from the front end portion of the front side frame 3 and transmitted rearwardly.

As shown in FIG. 12A, the collision load inputted to the front end portion of the front side frame 3 causes crushing of its front area, and concurrently bending of the bending portion T1, the bending portion T2, and a middle position between these bending portions T1, T2.

Herein, since the first and second outer beads 32a, 32b are the concaved bead, the bending portions T1, T2 bend inwardly, meanwhile the middle position between these bending portions T1, T2 bends outwardly as shown in FIG. 12A.

As the vehicle collision further proceeds, as shown in FIG. 12B, the front side frame 3 bends greatly in a zigzag buckling state. Thus, the great collision load can be absorbed through this buckling deformation of the front side frame 3, so that the dash panel can be restrained securely from moving back, and thereby the space in the vehicle room can be maintained properly.

Further, in case the above-described buckling deformation of the front side frame 3 occurs, there happens outwardly-moving deformation of the front portion of the front side frame 3 around the middle-portion attaching member 61. Thereby, a tensional load which is shown by a bold arrow a in FIGS. 3 and 7 acts at the pipe-shaped attaching member 21 around the middle-portion attaching member 61. This tensional load acts obliquely outwardly and forwardly as shown in FIG. 3 in the plan view, and obliquely forwardly and upwardly as shown in FIG. 7 in the side view. Thus, a three-dimensional torsion occurs at the pipe-shaped attaching member 21 due to the above-described tensional load.

Herein, since the notch 61e is formed at the rear portion of the lower portion of the support portion 61A, the lower portion 21c of the pipe-shaped attaching member 21 possibly moves rearwardly and inwardly. As a result, the torsion of the pipe-shaped attaching member is allowed.

Figure 14:
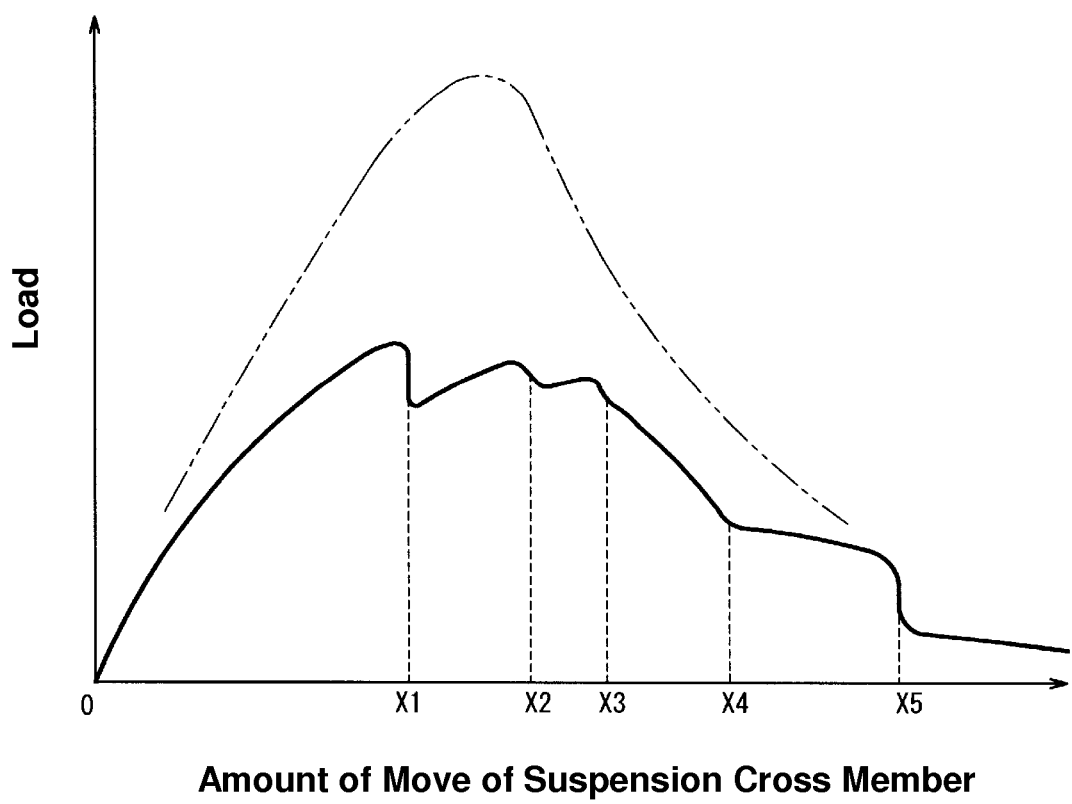
FIG. 14 is a graph showing relationships between the amount of move of the suspension cross member body relative to a vehicle body and a load in the vehicle frontal collision.

FIG. 14 is a graph showing relationships between the amount of move X of the suspension cross member body 6 relative to the vehicle body 1 and the load in the frontal collision of the vehicle V. When the above-described oblique tensional load acts on the pipe-shaped attaching member 21 and thereby the three-dimensional torsion occurs at this member 21, the stress concentrates at the joint position P2 (see FIG. 3) between the pipe-shaped attaching member 21 and the upper portion of the support portion 61A first because the lower portion 21c of the pipe-shaped attaching member 21 is supported with the lower support rigidity than that of the inward portion, front portion or rear portion of the side face portion 21b. Then, the joint (connection) between the inward portion of the side face portion 21b and the support portion 61A is released (the move amount X1 shown in FIG. 14).

Next, because the joint portion P3 (see FIGS. 3 and 6) of the joint piece 61f of the rear panel member 61C is smaller than the joint portion P1 (see FIGS. 3 and 5) of the joint piece 61b of the front panel member 61B, the joint between the rear portion of the side face portion 21b and the joint piece 61f (the rear portion of the support portion 61A) is released (the move amount X2 shown in FIG. 14).

Then the stress concentrates at the joint portion P1 between the front portion of the side face portion 21b and the joint piece 61b of the front panel member 61B, so that the joint of the front portion of the side face portion 21b and the joint piece 61b (front portion of the support portion 61A) is released (the move amount X3-X4 shown in FIG. 14).

Finally, the stress concentrates at the joint portion between the joint flange 61c of the lower support member 61D supporting the lower portion 21c of the pipe-shaped attaching member 21 with non-fixing and front panel member 61B (the move amount X4-X5 shown in FIG. 14), and thereby the joint of the both is released. Accordingly, the support of the lower portion 21c by the lower support member 61D (the lower portion of the support portion 61A) is released, so that the suspension cross member body 6, i.e., the middle portion, in the vehicle longitudinal direction, of the suspension cross member 11 is detached from the vehicle body 1.

As described above, by releasing the support states of the inward portion, the front portion, and the lower portion of the side face portion 21b of the pipe-shaped attaching member 21 in order with different timings when the pipe-shaped attaching member 21 receives the above-described tensional load, the peak values of the load to be required can be properly lowered compared with a case in which the above-described support states are released concurrently (see a graph shown by a two-dotted broken line in FIG. 14).

Further, in the initial stage of the frontal collision of the vehicle V shown in FIGS. 12A and 13A, the front portion of the suspension cross member 11 starts moving back due to the function of the collision load.

Figure 15:
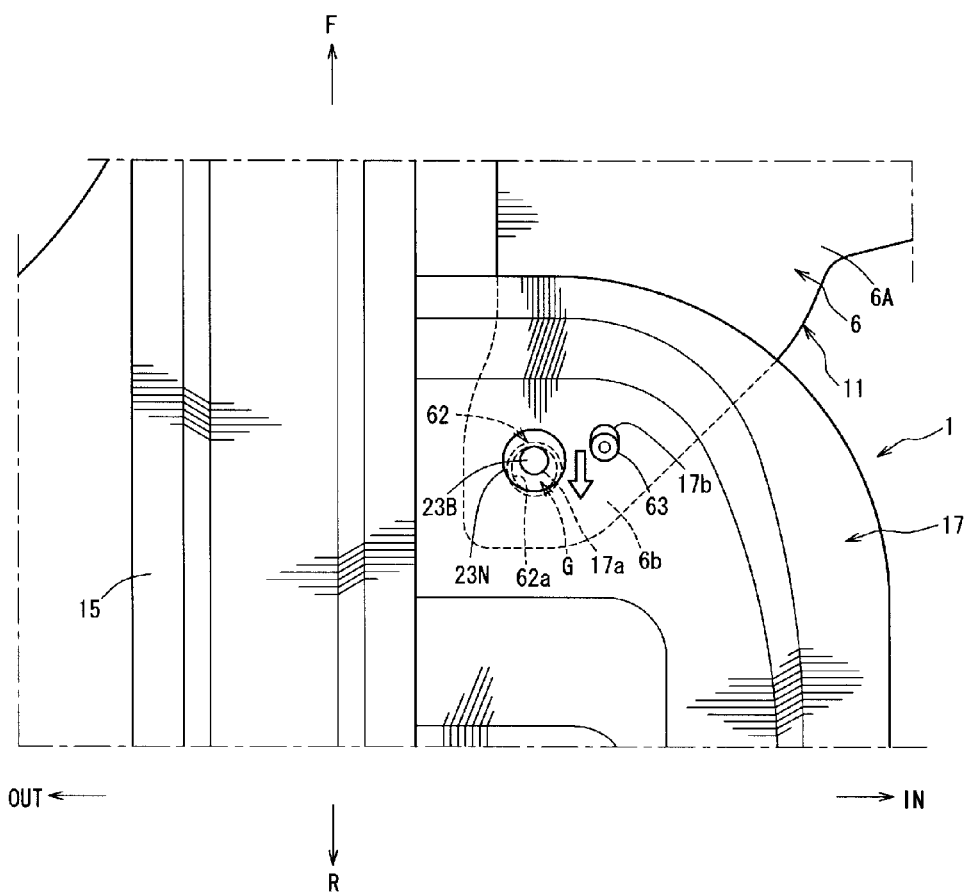
FIG. 15 is a plan view showing a state of the rear-portion attachment face portion and its surrounding portion in the vehicle frontal collision, which corresponds to FIG. 8.

While the bolt 23b and the positioning pin 63 are pushed rearwardly at the rear-portion attachment face portion 6b according to the suspension cross member 11 at this time, since the gap G is formed between the bolt 23B and the collar member 62 in the present embodiment, the rear-portion attachment face portion 6b including the collar member 62 is movable rearwardly as shown in FIG. 15.

Figure 16:
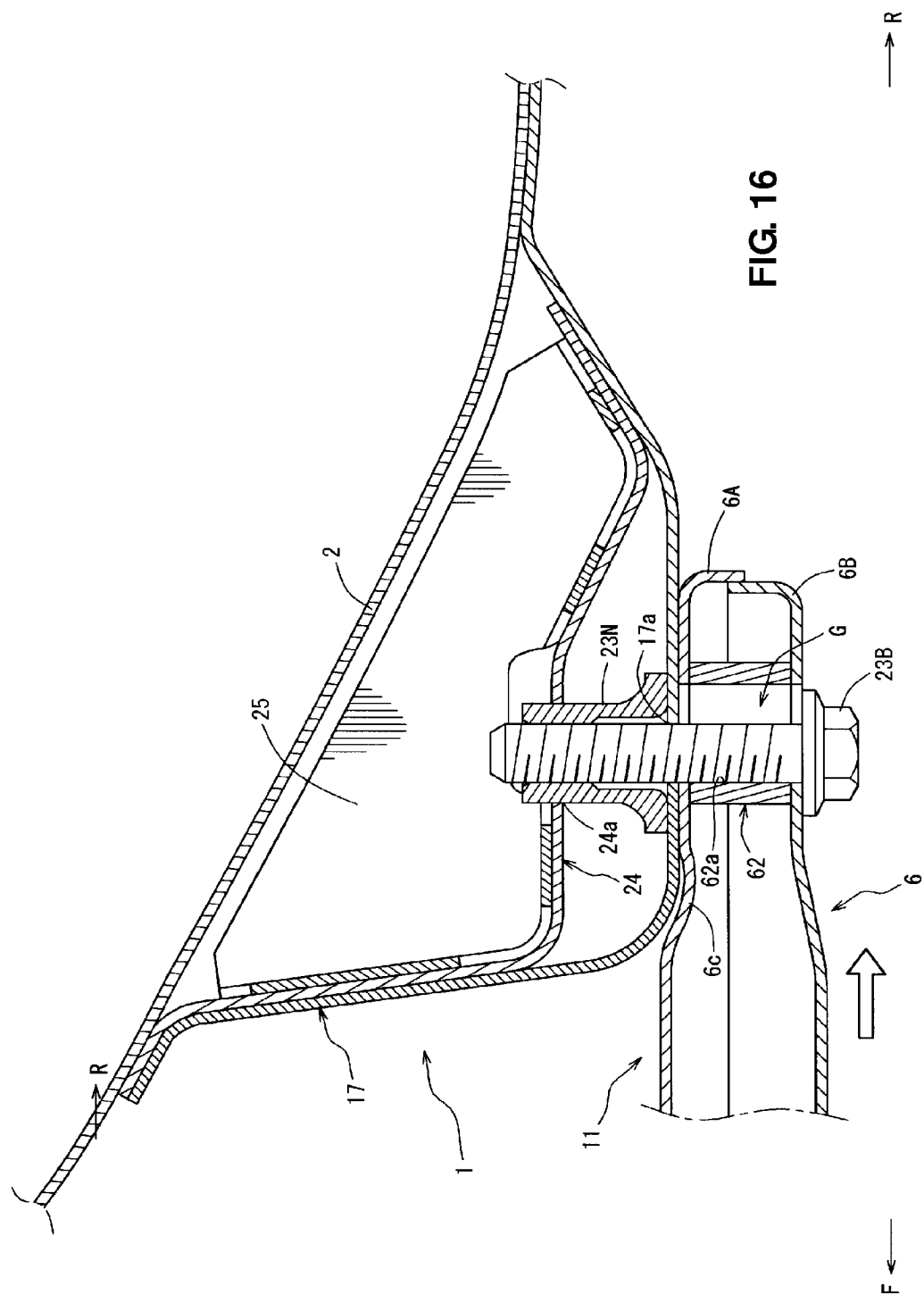
FIG. 16 is a sectional view showing a state of the rear-portion attachment face portion and its surrounding portion in the initial stage of the vehicle frontal collision, which corresponds to FIG. 9.

Accordingly, the positioning pin 63 can move rearwardly, expanding the positioning hole 17b of the tunnel frame 17 as shown in FIG. 15. Then, when the positioning pin 63 moves rearwardly, the bolt 23B contacts the front portion of the collar member 62 as shown in FIG. 16. Herein, FIG. 15 is a plan view showing the state of the rear-portion attachment face portion 6b and its surrounding portion in the frontal collision of the vehicle V, which corresponds to FIG. 8. FIG. 16 is a sectional view showing a state of the rear-portion attachment face portion 6b and its surrounding portion in the initial stage of the frontal collision of the vehicle V, which corresponds to FIG. 9.

Thus, since the positioning pin 63 expands the positioning hole 17b, the support rigidity of the periphery of the bolt hole 17a which is positioned near the positioning hole 17b can be decreased greatly. Especially, in case the positioning pin 63 is located slightly in front of the bolt hole 17a, like the present embodiment, the bolt hole 17a can be expanded more greatly in the longitudinal direction along the side edge of the bolt hole 17a. Accordingly, the above-described decease of the support rigidity of the periphery of the bolt hole 17a can be achieved more properly in this case.

At this moment, a rotational moment in a direction of moving the lower end portion of the bolt 23B upwardly and rearwardly occurs because the reinforcement 24 has a higher rigidity than the tunnel frame 17.

Figure 17:
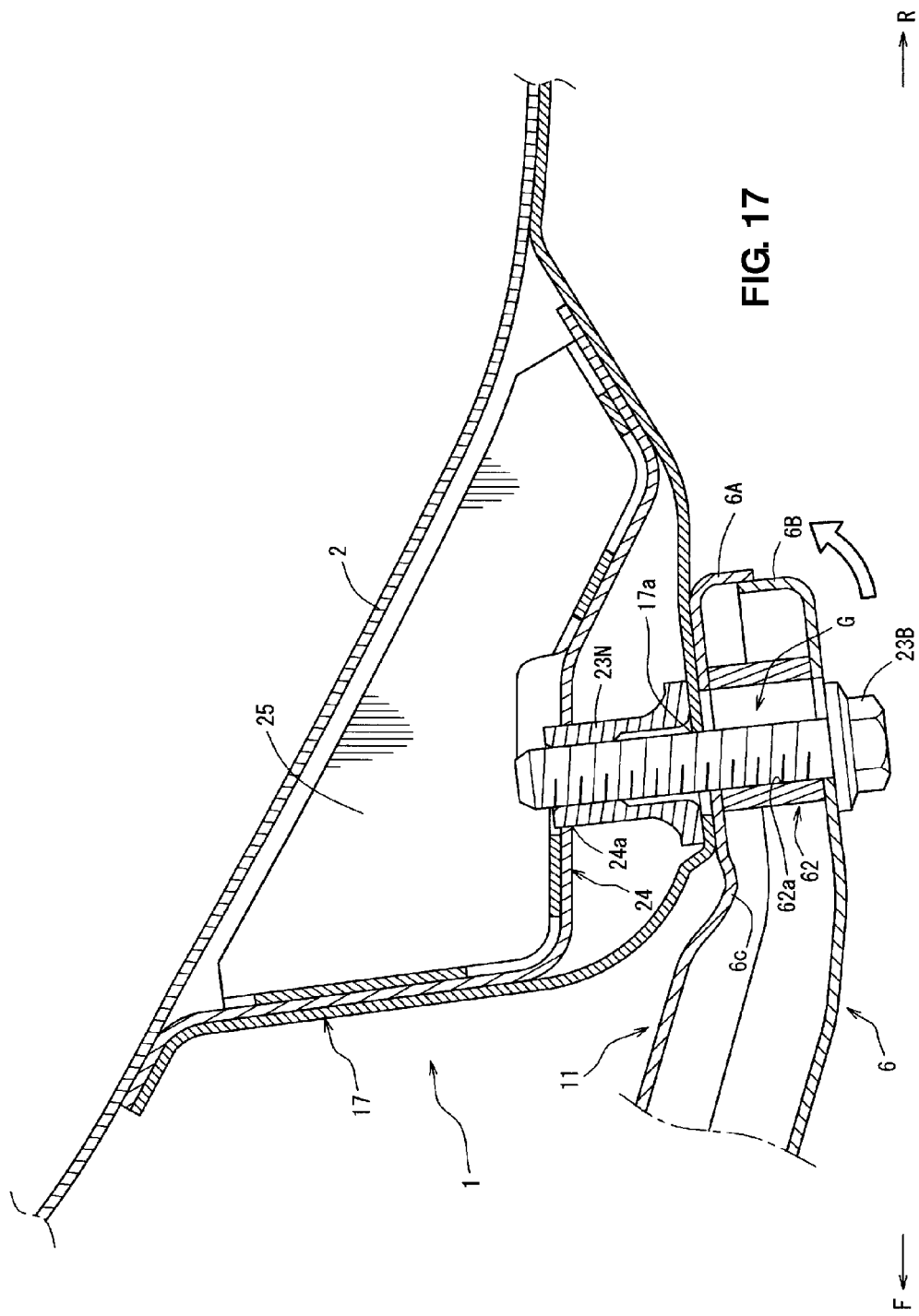
FIG. 17 is a sectional view showing a state of the rear-portion attachment face portion and its surrounding portion in a middle stage of the vehicle frontal collision, which corresponds to FIG. 9.

Further, since the above-described bead 6c extends in the vehicle width direction, it becomes a weak portion having a lower rigidity than the other portions when receiving the load in accordance with the moving back of the suspension cross member 11. After the bolt 23B contacts the front portion of the collar member 62, a forward reaction force from the bolt 23B through the collar member 62 is further added to another forward reaction force from the positioning pin 63. Thereby, a rotational moment which rotates the rear-portion attachment face portion 6b forwardly and downwardly around an axis connecting the positioning pin 63 and the collar member 62 and extending in the vehicle width direction increases greatly. Thus, when the suspension cross member 11 moves back, the stress concentrates at the portion between the positioning pin 63 and the positioning hole 17b first, so that the positioning hole 17b is expanded easily. Then, when the bolt 23B contacts the collar member 62, the forward-and-downward rotational moment acting on the rear-portion attachment portion 6b becomes considerably great. For this reason, as shown in FIG. 17, bending around the bead 6c formed in the vehicle width direction occurs, and the slant relative to the tunnel frame 17 increases accordingly. And, the bolt 23B and the weld nut 23N start rotating so that its lower end portion moves rearwardly and upwardly. Herein, FIG. 17 is a sectional view showing a state of the rear-portion attachment face portion 6b and its surrounding portion in a middle stage of the vehicle frontal collision, which corresponds to FIG. 9.

Then, when the collision load is further added and thereby the above-described slant of the rear-portion attachment portion 6b and the rotations of the bolt 23B and the weld nut 23N progress, a contact portion of the rear end portion of the rear-portion attachment face portion 6b with the tunnel frame 17 becomes a fulcrum, so that a torsional load to extract the bolt 23B and the weld nut 23N downwardly and rearwardly by a so-called leverage occurs.

Herein, since the support rigidity at the periphery of the bolt hole 17a has decreased because the positioning pin 63 has already expanded the positioning hole 17b of the tunnel frame 17, when the above-described torsional load acts, the bolt hole 17a greatly deforms and expands. Accordingly, in the last stage of the vehicle frontal collision, the bolt 23B and the weld nut 23N get through this bolt hole 17a or the periphery of the bolt hole 17a tears, so that the bolt 23B and the weld nut 23N drop from the tunnel frame 17 properly as shown in FIGS. 12A and 13B. Thereby, the rear-portion attachment portion 6b, i.e., the rear portion of the suspension cross member 11 can be detached from the vehicle body 1, and finally the suspension cross member 11 can be detached from the vehicle body 1 perfectly.

As described above, according to the present embodiment, the front portion, the rear portion, and the inward portion of the side face portion 21b of the pipe-shaped attaching member 21 are supported at the support portion 61A of the middle-portion attaching member 61 at the middle portion of the suspension cross member 11. Accordingly, the support rigidity, in the vehicle width direction, of the suspension cross member 11 can be secured during the normal vehicle traveling.

Meanwhile, by supporting the lower portion 21c of the pipe-shaped attaching member 21 with the lower support rigidity than that for the inward portion, front portion and rear portion of the side face portion 21b, the torsion of the pipe-shaped attaching member 21 which occurs in the frontal collision of the vehicle V is allowed so that the detachment of the middle-portion attaching member 61 from the pipe-shaped attaching member 21 can be promoted.

Moreover, in this case, since the timing of releasing the connection support states of the side face portion 21b and the lower portion 21c can be offset from each other, the load required can be lowered compared with the case of releasing these timings concurrently. Accordingly, the detachment of the middle-portion attaching member 61 from the pipe-shaped attaching member 21 can be easier.

That is, the support rigidity, in the vehicle width direction, of the suspension cross member 11 can be secured during the normal vehicle traveling, while the easy detachment of the middle-portion attaching member 61 from the pipe-shaped attaching member 21 is enabled in the frontal collision of the vehicle V. Consequently, the retreat of the power unit P/U can be conducted smoothly without being hindered by the suspension cross member 11, so that it can be properly restrained that the collision load has the bad influence on passengers.

Further, since the middle-portion attaching member 61 is formed in the closed cross section with the front and rear panel members 61B, 61C which are joined together at the specified portion (see the joint portion P4 in FIG. 3), and the support portion 61A extends in the vehicle width direction, the support rigidity, in the vehicle width direction, of the suspension cross member 11 at the support portion 61A can be properly increased. Further, by adjusting the range of the joint portion (the joint portion P4) of the front and rear panel members 61B, 61C, the rigidity against the torsion occurring at the pipe-shaped attaching member 21 in the frontal collision of the vehicle V can be adjusted easily.

Moreover, in case the middle-portion attaching member 61 is formed by the front and rear panel members 61B, 61C, by providing the non-joint portion P5 at the middle-portion attaching member 61b near the joint portion P4 at the upper portions of the front and rear panel members 61B, 61C, the torsional rigidity of the pipe-shaped attaching member 21 can be more decreased.

Also, since the inward portion, front portion and rear portion of the side face portion 21b of the pipe-shaped attaching member 21 is joined to the support portion 61A, and the lower portion 21c of the pipe-shaped attaching member 21 is fastened together with the tip portion of the lower support member 61D in the non-fixing state, the support rigidity of the lower portion 21c of the pipe-shaped attaching member 21 can be easily set to be properly low.

Further, since the lower end portion of the joint portion P3 between the joint piece 61f of the rear panel member 61C and the pipe-shaped attaching member 21 is positioned above the lower end portion of the joint portion P1 between the joint piece 61b of the front panel member 61B and the pipe-shaped attaching member 21, the lower portion 21c is allowed to move rearwardly in the frontal collision of the vehicle V so that the pipe-shaped attaching member 21 can be twisted (made have torsion) more easily.

Meanwhile, since the front side frame 3 has the bending portions T1, T2 so as to bend outwardly, in the vehicle width direction, at its middle portion in the frontal collision of the vehicle V, the collision load in the frontal collision of the vehicle V can be absorbed securely by the bending of the front side frame 3.

Herein, while the slant load is applied to the front side and the outward side of the upper portion of the pipe-shaped attaching member 21, since the present embodiment has the notch 61e which is formed between the rear portion and the lower portion of the support portion 61A and extends inwardly, the torsional rigidity of the pipe-shaped attaching member 21 against the load acting obliquely forwardly and outwardly can be decreased.

Further, since the lower portion of the support portion 61A is formed by the lower support member 61D which is different from the front and rear panel members 61B, 61C, its forming by pressing can be facilitated. And, by having the lower support member 61D extend in the vehicle width direction, the rigidity in the vehicle width direction can be increased, while the rigidity in the vehicle longitudinal direction can be set to be properly low.

Since the positioning pin 63 and the positioning hole 17b into which the positioning pin 63 is inserted are formed at the rear portion of the suspension cross member 11, and the bolt holes 17a, 62a for fastening the suspension cross member body 6 to the tunnel frame 17 are formed near the positioning hole 17b, the support rigidity of the periphery of the bolt hole 17a can be secured during the normal vehicle traveling by inserting the positioning pin into the positioning hole 17b.

Meanwhile, in the frontal collision of the vehicle V, the support rigidity of the periphery of the bolt hole 17a can be decreased by expanding the positioning hole 17b by the positioning pin 63 moving back, so that the load required to extract the bolt 23B and the weld nut 23N from the vehicle body 1 can be lowered. Thus, the load required to detach the suspension cross member 11 from the tunnel frame 17 (vehicle body 1) can be decreased.

That is, since the support rigidity of the suspension cross member 11 at the fastening portions to the vehicle body 1 can be secured during the normal vehicle traveling, while the load required to detach the suspension cross member 11 from the vehicle body 1 can be decreased in the frontal collision of the vehicle V, the retreat of the power unit P/U can be conducted smoothly without being hindered by the suspension cross member 11, so that it can be properly restrained that the collision load has the bad influence on passengers.

Further, since the suspension cross member 11 has, in the vicinity of the rear-portion attachment face portion 6b, the bead 6c which deforms so that the slant of the rear-portion attachment face portion 6b relative to the tunnel frame 17 increases when the suspension cross member 11 moves back, the torsional load for the bolt 23B and the weld nut 23N can be increased. Thereby, the bolt 23B and the weld nut 23N can be extracted from the vehicle body 1 easily.

Since the bead 6c has, near the positioning pin 63, the slant portion 6c1 which slants in the vehicle longitudinal direction, i.e., in the direction of the load acting in the frontal collision of the vehicle V, the strength of a specified portion around the base of the positioning pin 63 against the above-described load can be increased. Accordingly, the support rigidity of the suspension cross member 11 can be properly increased during the normal vehicle traveling, while the expansion of the positioning hole 17b by the move of the positioning pin 63 can be conducted stably in the frontal collision of the vehicle V.

Herein, the forming of the bead 6c will be described more specifically. This bead 6c is arranged in front of, substantially in parallel to a line connecting the positioning pin 63 and the through hole 24a, and, preferably the bead 6c slants closer to the bolt 23B than the positioning pin 63. Thereby, in the frontal collision of the vehicle V, the rigidity can be decreased by cooperation of the deformation of the base of the positioning pin 63 with the bead 6c, so that both securing the rigidity during the normal vehicle traveling and easily bending the rear-portion attachment face portion 6b can be achieved.

Herein, in the above-described fifth patent publication (Japanese Patent Laid-Open Publication No. 2008-56191), when the power unit retreats relatively in the vehicle frontal collision, the side frame bends due to the function of the bending promotion portion, and the connection between the middle support member and the connecting member is released. According to this prior art, the bending portion of the side frame is set at the middle portion which is far away forwardly from the rear end portion. In this case, the rather great deformation stroke of the side frame may be required to detach the rear portion of the suspension cross member from the vehicle body and release the connection of the both.

According to the present embodiment, however, since the bead 6c is arranged near the rear-portion attachment face portion 6b, specifically in right front of this portion 6b, the bolt 23B and the weld nut 23N can be extracted from the vehicle body 1 even if the deformation stroke of the rear-portion attachment face portion 6b is small.

Further, in the above-described fourth patent publication (Japanese Patent Laid-Open Publication No. 2006-240325), the collar, a rear portion of which is not connected to the vehicle-body-side suspension cross member, is provided at the connection portion of the suspension cross member to the vehicle-body-side side member in order to prevent that the retreat of the power unit is hindered by the power unit in the vehicle frontal collision. In this prior art, no rear end portion of the suspension cross member exists in back of the connection portion to the side member. In this case, since no fulcrum to be formed by contact of the rear end portion of the suspension cross member with the side member is formed, the bending of the suspension cross member is not promoted sufficiently. Thus, there is a concern that the bolt and nut could not be extracted from the vehicle body securely.

According to the present embodiment, however, as shown in FIG. 17, when the rear-portion attachment face portion 6b slants, the contact portion of the rear end portion of the rear-portion attachment face portion 6b with the tunnel frame 17 becomes a fulcrum so that the torsional load to extract the bolt 23B and the weld nut 23N downwardly and rearwardly can be generated.

Moreover, since the pin 63 and the hole 17b are the positioning pin and the positioning hole of the suspension cross member body 6 for the vehicle body 1, respectively, a member necessary for positioning of the suspension cross member 11 and a member to decrease the rigidity of the periphery of the bolt hole 17a can be common to each other.

Further, since the positioning pin 63 is provided at the suspension cross member body 6, not the middle-portion attaching member 61, the number of portions where tolerances between the suspension arm 7 and the positioning pin 63 occur can be decreased, so that the accuracy of positioning the suspension cross member 11 can be improved.

Also, according to the present embodiment, the positioning pin 63 is provided at the plate-shaped upper panel member 6A (rear-portion attachment face portion 6b) constituting the suspension cross member body 6, and the positioning hole 17b into which the positioning pin 63 is inserted is formed at the plate-shaped tunnel frame 17 on the side of the vehicle body, so that the rigidity of the rear-portion attachment face portion 6b (upper panel member 6A) of the suspension cross member body 6 is increased so as to be higher than that of the tunnel frame 17 on the side of the vehicle body 1. In this case, the positioning hole 17 can be expanded easily by the move of the positioning pin 63 which is provided on the side of the rear-portion attachment face portion 6b having the high rigidity.

To the contrary, the positioning pin 63 may be provided at the tunnel frame 17, and the positioning pin 17b may be formed at the suspension cross member body 6 in the present invention, for example. In this case, while the head portion of the bolt 23B is arranged around the bolt hole 17a, it is preferable that the head portion of the bolt 23B be located in the vicinity, in the vehicle width direction, of an arrangement position of the positioning hole 17b within a range of 10 mm or smaller.

However, in case the above-described structure is applied, it may be necessary that the vehicle-body panel, such as the tunnel frame 17, has a high rigidity in order to expand the positioning hole 17b easily. This may cause a heavy weight of the vehicle body 1 due to the thick vehicle panel and the like. By contrast, according to this embodiment, the rigidity on the side of the rear-portion attachment face portion 6b has the high rigidity, so that both lightening the weight of the vehicle V and easily expanding the positioning hole 17b in the frontal collision of the vehicle V can be achieved.

Also, since either the head portion of the bolt 23B or the seat face of the weld nut 23N is provided is arranged around the bolt hole 17a, and the positioning hole 17b is located in the vicinity, in the vehicle width direction, of the arrangement position of the above-described head portion or the above-described seat face within the range of 10 mm or smaller, the rigidity of the above-described seat face can be decreased securely.

Further, since the forward gap G between the bolt hole 62a of the collar member 62 and the bolt 23B is set to be greater than the gap between the positioning pin 63 and the positioning hole 17b, the contact of the bolt 23B with the collar member 62 can be avoided by the forward gap G when the suspension cross member 11 starts moving back in the frontal collision of the vehicle V. Thereby, the stress can be made concentrate at the positioning hole 17b first. Accordingly, before the bolt hole 17a is expanded by the bolt 23B, the positioning hole 17b can be expanded securely by the positioning pin 63.

Moreover, since the positioning pin 63 and the bolt 23B are arranged side by side, in the vehicle width direction, at the rear-portion attachment face portion 6b, the rigidity of the periphery of the bolt hole 17a is deceased by the move of the positioning pin 63 first, and then the bending moment of the rear-portion attachment portion 6b can be increased by the cooperation of the positioning pin 63 and the bolt 23B after the contact of the bolt 23B with the collar member 62. Accordingly, the strength necessary to expand the positioning hole 17b can be provided to the rear-portion attachment face portion 6b, and the easily-bending function can be provided as well.

Herein, the middle-portion attaching member 61 may be formed integrally with the suspension cross member body 6 so as to slant upwardly steeply (45° or more) from this member body 6, or formed by a different member from the suspension cross member body 6 as described above. Thus, both lowering the floor of the vehicle room and securing the bumper height can be achieved.

In this case, the tolerance may occur easily between the vehicle body 1 and the suspension cross member 11. However, this tolerance can be decreased by providing the positioning pin 63 at the rear-portion attachment face portion 6b of the rear end portion of the suspension cross member 11 according to the present embodiment.

While the middle-portion attaching member 61 is formed by the front and rear panel members 61B, 61C in the above-described embodiment, it may be formed by the upper and lower panels.

Embodiment 2

Figure 18:
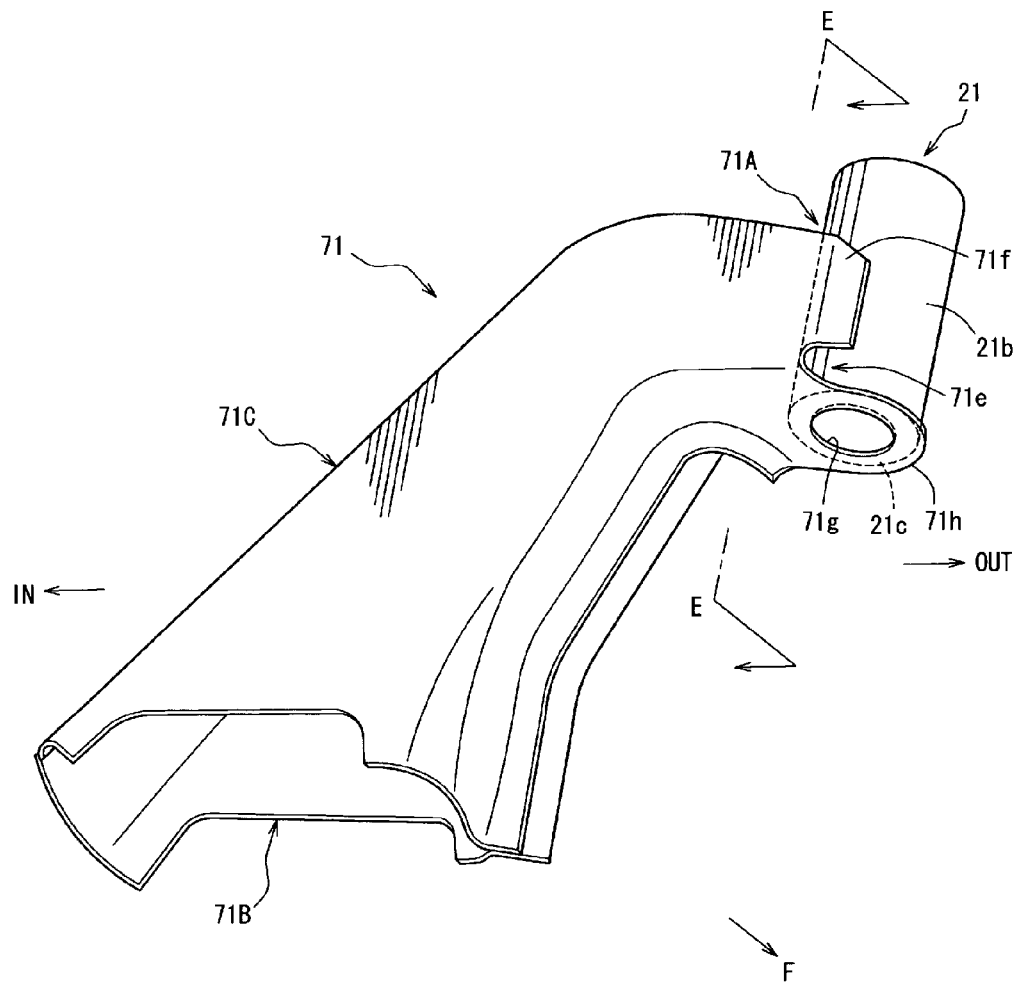
FIG. 18 is a perspective view showing a middle-portion attaching member according to a second embodiment of the present invention.
Figure 19:
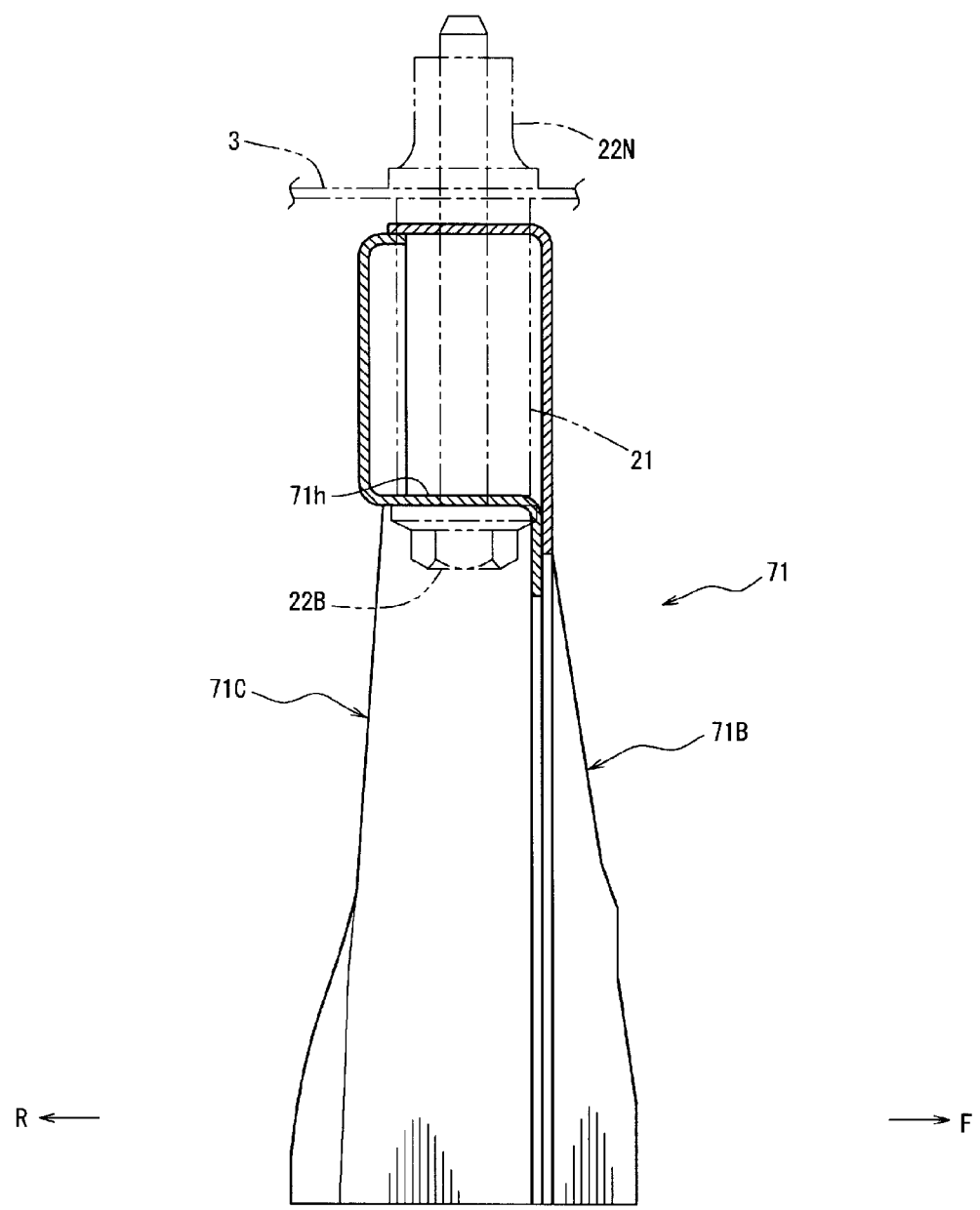
FIG. 19 is a sectional view taken along line E-E of FIG. 18.

While the portion supporting the lower portion 21c of the pipe-shaped attaching member 21 is constituted by another member different from the front panel member 61B or the rear panel member 61C in the above-described embodiment first embodiment, the present invention should not be limited to this. For example, as shown by a middle-portion attaching member 71 in FIGS. 18 and 19, a lower support portion 71h which corresponds to the lower support member 61D may be formed integrally with a rear panel 71C. FIG. 18 is a perspective view showing the middle-portion attaching member 71 according to a second embodiment of the present invention. FIG. 19 is a sectional view taken along line E-E of FIG. 18. The same elements of the second embodiment as those of the above-described first embodiment are denoted by the same reference numerals, descriptions of which are omitted.

The middle-portion attaching member 71 is a vertical member which is comprised of a front panel member 71B and a rear panel member 71C which are formed in a reverse-L shape and joined together to form a closed cross section as shown in FIG. 19 which is similar to the front and rear panel members 61B, 61C of the first embodiment.

The front panel member 71B extends outwardly with its tip portion (not illustrated) constituting part of the support portion 71A. This tip portion is joint and fixed to the side face portion 21b of the pipe-shaped attaching member 21, thereby supports it.

A notch 71e which extends inwardly from the pipe-shaped attaching member 21 is formed at a tip portion (support portion 71A) of the rear panel member 71 at its rear and lower position. Meanwhile, at its middle portion is formed a joint piece 71f which extends relatively outwardly due to forming of the notch portion 71e. This joint piece 71f is joined and fixed to a rear portion of the side face portion 21b of the pipe-shaped attaching member 21, thereby supports it.

Further, a lower support portion 71h is formed at a lower portion of the tip portion of the rear panel member 71C so as to be continuous from the notch portion 71e.

This lower support member 71h is of a flat plate shape so that it extends outwardly from the notch portion 71e horizontally. The lower portion 21c of the pipe-shaped attaching member 21 is placed on a tip portion of the lower support portion 71h. The tip portion of the lower support portion 71h and the lower portion 21c of the pipe-shaped attaching member 21 are fastened together by the bolt 23B and weld nut 22N in a non-fixing state without welding. Herein, reference numeral 71*g* denotes a through hole in which the bolt 22B is inserted.

Thus, even in a structure in which the lower support portion 71*h* integrally formed with the rear panel member 71C and the lower portion 21*c* of the pipe-shaped attaching member 21 are fastened together in the non-fixing state, the lower portion 21*c* of the pipe-shaped attaching member 21 can be supported with a properly lower support rigidity than the inward portion, front portion and rear portion of the side face portion 21*b*.

The other operations and effects are substantially the same as those of the above-described first embodiment. Herein, while the lower support portion 71*h* is formed at the rear panel 71C in the present embodiment shown in FIGS. 18 and 19, it may be formed at the frontal panel member 71B.

While the perimeter frame is applied as the suspension cross member 11 in the above-described embodiments, the suspension cross member should not be limited to this. For example, H, I, II or U-shaped suspension cross member may be applied.

Further, while the weld nut 23N is fixed to the tunnel frame 17 of the vehicle-body-side support portion in the above-described embodiments, a head portion of a weld bolt may be fixed to the tunnel frame 17 in place of the weld nut.

Moreover, while the bolt 23B is fixed to the tunnel frame 17 via the weld nut 23N and the moving back of the suspension cross member body 6 is restricted by its contract with the bolt 23B in the above-described embodiments, the structure for restricting the moving back of the suspension cross member body 6 should not be limited to this. For example, a modified structure shown in FIG. 20 may be applied. In this modification, the tunnel frame 17 and the suspension cross member body 6 are fastened together by a bolt 23B' and nut 23N' which are not fixed (welded) to these members 17, 6. Further, a rearward gap G' is formed between a bolt hole 17*a*' and the bolt 23B' in an initial stage as shown in FIG. 20. Moreover, a case 50 (or any other member, such as a projection) is fixed onto the tunnel frame 17 so as to surround a head portion of the bolt 23B' with a specified distance. This modified lower structure can provide substantially the same operations and effects of those of the above-described embodiments.

The present invention should not be limited to the above-described embodiments and modification, and any other modifications and improvements may be applied within the scope of a sprit of the present invention.

What is claimed is:

1. A lower structure of an automotive vehicle, comprising:
   a suspension cross member provided behind a power unit and extending in a vehicle width direction;
   a plate-shaped vehicle-body-side support portion supporting the suspension cross member;
   a pair of pin and bolt hole provided either the vehicle-body-side support portion or a plate-shaped supported portion of the suspension cross member;
   a pair of through hole and bolt hole provided the other of the vehicle-body-side support portion or the plate-shaped supported portion of the suspension cross member; and
   a pair of bolt and nut,
   wherein said vehicle-body-side support portion and said plate-shaped supported portion of the suspension cross member are fastened with said pair of bolt and nut in a state in which the bolt of said pair of bolt and nut is inserted into both of the bolt holes of said pair of pin and bolt hole and said through hole and bolt hole and the pin of said pair of pin and bolt hole is inserted into the through hole of said pair of through hole and bolt hole.

2. The lower structure of an automotive vehicle of claim 1, wherein said suspension cross member has, in the vicinity of the supported portion thereof, a weak portion which deforms so that a slant of the supported portion of the suspension cross member relative to said vehicle-body-side support portion increases when the suspension cross member moves back according to a retreat of the power unit.

3. The lower structure of an automotive vehicle of claim 2, wherein the diameter of said pin is substantially the same as the diameter of said through hole.

4. The lower structure of an automotive vehicle of claim 3, wherein either the nut or a head portion of the bolt of said pair of bolt and nut is provided at said vehicle-body-side support portion, and said supported portion of the suspension cross member has a rigidity which is greater than that of the vehicle-body-side support portion.

5. The lower structure of an automotive vehicle of claim 4, wherein either a seat face of the nut or a head portion of the bolt of said pair of bolt and nut is provided is arranged around the bolt hole of said pair of through hole and bolt hole, and the through hole of said pair of through hole and bolt hole is located in the vicinity, in the vehicle width direction, of an arrangement position of said seat face of the nut or the head portion of the bolt within a range of 10 mm or smaller.

6. The lower structure of an automotive vehicle of claim 5, wherein a gap between said bolt and either the bolt hole of said pair of pin and bolt hole or the bolt hole of said pair of through hole and bolt hole is set to be greater than a gap between said pin and said through hole so that the pin contacts the through hole before the bolt contacts the bolt hole of said pair of pin and bolt hole or the bolt hole of said pair of through hole and bolt hole when the suspension cross member moves back according to a retreat of the power unit.

7. The lower structure of an automotive vehicle of claim 6, wherein said suspension cross member comprises a suspension cross member body supporting a suspension arm and a vertical member extending upwardly from the suspension cross member body, and said supported portion of the suspension cross member is provided at said suspension cross member body.

8. The lower structure of an automotive vehicle of claim 1, wherein the diameter of said pin is substantially the same as the diameter of said through hole.

9. The lower structure of an automotive vehicle of claim 1, wherein said pin is a positioning pin of the suspension cross member for a vehicle body and said through hole is a positioning hole.

10. The lower structure of an automotive vehicle of claim 1, wherein either the nut or a head portion of the bolt of said pair of bolt and nut is provided at said vehicle-body-side support portion, and said supported portion of the suspension cross member has a rigidity which is greater than that of the vehicle-body-side support portion.

11. The lower structure of an automotive vehicle of claim 1, wherein either a seat face of the nut or a head portion of the bolt of said pair of bolt and nut is provided is arranged around the bolt hole of said pair of through hole and bolt hole, and the through hole of said pair of through hole and bolt hole is located in the vicinity, in the vehicle width direction, of an arrangement position of said seat face of the nut or the head portion of the bolt within a range of 10 mm or smaller.

12. The lower structure of an automotive vehicle of claim 1, wherein a gap between said bolt and either the bolt hole of said pair of pin and bolt hole or the bolt hole of said pair of through hole and bolt hole is set to be greater than a gap between said pin and said through hole so that the pin contacts the through hole before the bolt contacts the bolt hole of said pair of pin and bolt hole or the bolt hole of said pair of through hole and bolt hole when the suspension cross member moves back according to a retreat of the power unit.

13. The lower structure of an automotive vehicle of claim 1, wherein said suspension cross member comprises a suspension cross member body supporting a suspension arm and a vertical member extending upwardly from the suspension cross member body, and said supported portion of the suspension cross member is provided at said suspension cross member body.

14. A lower structure of an automotive vehicle, comprising:
a suspension cross member provided behind a power unit and extending in a vehicle width direction;
a plate-shaped vehicle-body-side support portion supporting the suspension cross member;
a pair of pin and bolt hole provided either the vehicle-body-side support portion or a plate-shaped supported portion of the suspension cross member;
a pair of through hole and bolt hole provided the other of the vehicle-body-side support portion or the plate-shaped supported portion of the suspension cross member; and
a pair of bolt and nut,
wherein said vehicle-body-side support portion and said plate-shaped supported portion of the suspension cross member are fastened with said pair of bolt and nut in a state in which the bolt of said pair of bolt and nut is inserted into both of the bolt holes of said pair of pin and bolt hole and said through hole and bolt hole and the pin of said pair of pin and bolt hole is inserted into the through hole of said pair of through hole and bolt hole, and
a forward gap between said bolt and the bolt hole of said pair of pin and bolt hole is set to be greater than a gap between said pin and said through hole so that the pin contacts the through hole before the bolt contacts the bolt hole of said pair of pin and bolt hole when the suspension cross member moves back according to a retreat of the power unit.

15. A lower structure of an automotive vehicle, comprising:
a suspension cross member provided behind a power unit and extending in a vehicle width direction;
a plate-shaped vehicle-body-side support portion supporting the suspension cross member;
a pair of pin and bolt hole provided either the vehicle-body-side support portion or a plate-shaped supported portion of the suspension cross member;
a pair of through hole and bolt hole provided the other of the vehicle-body-side support portion or the plate-shaped supported portion of the suspension cross member; and
a pair of bolt and nut,
wherein said vehicle-body-side support portion and said plate-shaped supported portion of the suspension cross member are fastened with said pair of bolt and nut in a state in which the bolt of said pair of bolt and nut is inserted into both of the bolt holes of said pair of pin and bolt hole and said through hole and bolt hole and the pin of said pair of pin and bolt hole is inserted into the through hole of said pair of through hole and bolt hole, and
a rearward gap between said bolt and the bolt hole of said pair of through hole and bolt hole is set to be greater than a gap between said pin and said through hole so that the pin contacts the through hole before the bolt contacts the bolt hole of said pair of through hole and bolt hole when the suspension cross member moves back according to a retreat of the power unit.

* * * * *